(12) United States Patent
Rogers

(10) Patent No.: US 8,613,646 B2
(45) Date of Patent: Dec. 24, 2013

(54) SYSTEMS AND METHODS FOR CONTROLLING PLAYER CHARACTERS IN AN INTERACTIVE MULTIPLAYER STORY

(76) Inventor: Henk B. Rogers, Honolulu, HI (US)

( * ) Notice: Subject to any disclaimer, the term of this patent is extended or adjusted under 35 U.S.C. 154(b) by 0 days.

(21) Appl. No.: 13/354,418

(22) Filed: Jan. 20, 2012

(65) Prior Publication Data

US 2012/0190449 A1 Jul. 26, 2012

Related U.S. Application Data

(60) Provisional application No. 61/434,896, filed on Jan. 21, 2011.

(51) Int. Cl.
*A63F 9/24* (2006.01)
*A63F 13/00* (2006.01)

(52) U.S. Cl.
USPC ........ 463/1; 463/36; 463/37; 463/38; 463/42; 463/43

(58) Field of Classification Search
USPC ..................................... 463/1, 36–38, 42–43
See application file for complete search history.

(56) References Cited

U.S. PATENT DOCUMENTS

| | | | |
|---|---|---|---|
| 6,402,619 B1 * | 6/2002 | Sato ............................. | 463/43 |
| 2002/0124048 A1 | 9/2002 | Zhou | |
| 2004/0229685 A1 * | 11/2004 | Smith et al. ................. | 463/29 |
| 2007/0162854 A1 | 7/2007 | Kikinis | |
| 2008/0004119 A1 | 1/2008 | Van Luchene et al. | |
| 2008/0081701 A1 | 4/2008 | Shuster | |
| 2009/0158150 A1 * | 6/2009 | Lyle et al. ..................... | 715/706 |
| 2010/0069159 A1 * | 3/2010 | Yamada et al. ................ | 463/43 |
| 2010/0331088 A1 | 12/2010 | Culbert | |

OTHER PUBLICATIONS

Lego Star Wars the Video Game, Game Manual (PC game manual, published on Apr. 2005) pp. 1-32.*
Lego Star Wars: The Video Game, from Wikipedia, (retrieved from http://en.wikipedia.org/wiki/Lego_Star_Wars:_The_Video_Game, retrieved on Sep. 30, 2012, pp. 1-5).*

* cited by examiner

*Primary Examiner* — Arthur O. Hall
*Assistant Examiner* — Jasson Yoo
(74) *Attorney, Agent, or Firm* — Ropes & Gray LLP

(57) ABSTRACT

A system that enables player character interactions in an interactive multiplayer game or story including a user interface that enables a user to control a player character in the interactive multiplayer game or story and a processor, in communication with the user interface, that i) tracks the actions of the player character within the interactive multiplayer game or story, and ii) transfers control of the player character from the user to the processor during an interaction event with a second player character in response to an interaction condition.

17 Claims, 16 Drawing Sheets

|   | 1 | 2 | 3 | 4 | 5 | 6 | 7 | 8 | 9 | 10 | 11 | 12 | 13 |
|---|---|---|---|---|---|---|---|---|---|----|----|----|----|
| A | ✓ |   |   |   |   |   |   |   |   |    |    |    | ✓  |
| B |   | ✓ |   |   |   | ✓ |   |   |   |    |    |    | ✓  |
| C |   |   | ✓ |   |   | ✓ |   |   |   |    | ✓  |    | ✓  |
| D |   |   | ✓ |   |   |   |   | ✓ |   |    | ✓  |    | ✓  |
| E |   |   |   | ✓ |   |   | ✓ |   | ✓ | ✓  | ✓  |    | ✓  |
| F |   |   |   |   | ✓ |   | ✓ |   |   | ✓  |    | ✓  | ✓  |

Fig. 3

SYSTEMS AND METHODS FOR CONTROLLING PLAYER CHARACTERS IN AN INTERACTIVE MULTIPLAYER STORY

CROSS-REFERENCE TO RELATED APPLICATIONS

This application claims priority to and the benefit of U.S. Patent Application No. 61/434,896, filed on Jan. 21, 2011, the entire contents of which are incorporated herein by reference.

FIELD OF THE INVENTION

The invention relates generally to systems and methods for providing an interactive multiplayer story or game. More particularly, in various embodiments, the invention relates to providing multiple users with interactive adventuring and role-playing in response to story-related trigger conditions.

BACKGROUND

Interactive movies and role-playing games have been commercially available for numerous years. An interactive movie is typically a video game presented using a full-motion video of either animated or live-action footage. Early interactive movies resulted from the introduction of laserdiscs and laserdisc players, which were the first video game devices that enabled a single player to select a course of action that affected the ongoing event sequence of a movie. Depending on the player's selection, a resulting video scene would be played. The first commercial interactive movie and game, Dragon's Lair, was introduced in 1983 and was played on a video arcade console.

Because interactive movies have traditionally only enabled one player to act out an event/scene, such systems are not capable of supporting the interaction of multiple players to act out an event/scene. Accordingly, there is a need to enable multiple players to interact with a movie or game concurrently.

Interactive movies are typically restrictive in providing a player character with a limited number of actions to perform, i.e., choose the left or right door. The limited number of action choices is typically considered unrealistic and predictable to players, resulting in a less enjoyable experience. Accordingly, there is a need to provide an interactive movie or playing experience that is less predictable and more realistic to players, and, therefore, more enjoyable.

A role-playing game (RPG) is typically a game where a player assumes the role of a character within a virtual world or environment. Early RPGs, such as Dungeons & Dragons®, were played using books and the imagination of the players.

With the improvements made in computer networking and graphics rendering, including improved 3D image rendering, increased network data rates, and increased computing capacity of clients and servers, role-playing games have migrated to computer systems and networks. Unfortunately, certain existing RPGs, such as the World of Warcraft®, which is a massively multiplayer online role-playing game (MMORPG), provide location-based adventuring where players often travel to a pre-defined location, such as a dungeon, to perform a particular activity. As a result, many players are often queued at the entrance of the same dungeon or activity and must wait for other players to perform the activity. Such a repetitive activity by each player diminishes the purpose of providing a realistic gaming experience. Accordingly, there is a need to provide a more realistic adventuring experience to players.

Location-based RPG adventuring typically requires players to be distributed among different servers that redundantly provide a particular adventure or story-line. For this reason, players using different servers are restricted in their ability to interact with each other. Therefore, there exists a need for allowing players using different servers to meet, socialize, and play together.

In addition to providing adventuring experiences, RPGs enable players to interact socially through these experiences. Certain RPGs, such as Second Life®, enable players to create avatars, i.e., virtual representations of themselves or alter-egos of themselves with desirable physical skills and characteristics. Avatars may also be referred to as "player characters." Unfortunately, certain players often lack the social skills or confidence to socially interact with other players. Accordingly, there is a need to assist less socially adapt players in their interactions with other players.

With respect to content development, RPGs have traditionally relied on developers to create story lines and dungeons. However, there is no efficient forum or mechanism to enable the integration of new story lines of various types into current RPGs. There are also no efficient mechanisms to facilitate the integration of merchandizing with story lines, or mechanisms that can address intellectual property concerns. Therefore, there is a need for creating a mechanism for enabling richer content development and integration into an RPG, while addressing intellectual property concerns associated with such content.

SUMMARY

The disclosure, in various embodiments, addresses deficiencies in the prior art by providing systems, methods and devices for providing an interactive multiplayer story or game based on a combination of one or more of timing (time-based adventuring), event occurrence (event-based adventuring), and notice (opportunity-based adventuring) to provide players with a more interactive, realistic, unpredictable, and enjoyable gaming experience.

A system for implementing an interactive multiplayer story may be a computer system. The computer system may include a networked computer system that provides multiple data interfaces to enable multiple players to interact with the system. Each player may be remotely located from the system, but use a client computer and/or application to access the computer system via a network such as the Internet. The system for implementing the interactive multiplayer story or game may include one or more computer servers and/or databases. The system may include a story application running on the server that provides various features of the interactive story to the players who are interfacing with the system and/or story application.

An interactive multiplayer role-playing game may include one or more stories that multiple players may act out using selected player characters. A story may include an account or recital of an event or a series of events, either true or fictitious. In a multiplayer environment, there may be thousands of players interested in playing or participating in a story. To support the play of multiple player characters concurrently, the game or story application may provide multiple instantiations or versions of a particular story (or portion and/or event of a story) concurrently or simultaneously. From the perspective of the story application, one instantiation of a story or portion of a story (one or more events) may be acted out by a first set of players, while another instantiation of the story may be acted out by a second set of players. The sequence of a series of events for one instantiation may also differ from the sequence of another instantiation of a story. For example, an interactive multiplayer story may be based on the movie Batman where the game application enables multiple players to assume one or more selected player characters of the Batman story. A first player may have a player character acting as Batman in a first instantiation of the story while a second player may have a different player character acting as Batman in a second instantiation of the story.

A storyline includes the plot of a story, book, play, movie, game, and/or a sequence of events arranged to define the plot of the story. A plot of a story may include the main plot and/or a subplot of the story.

An event includes anything that takes place or happens, especially something important; a happening; an incident that is related to a particular story, etc. Collectively, events can define an underlining plot of a story. They may be generated and coordinated by an application (e.g., the story application) upon satisfaction of various conditions. Detailed examples of conditions used by the story application to coordinate users from various parts of a virtual world will be described later herein. For example, if the story application runs an interactive story based on Batman, events within the Batman interactive story may include, and/or correspond to, scenes within the movie Batman. A player may create a player character that can, at various points throughout his time in a virtual world of the story application, be given the opportunity to act out the events of the Batman story. However, while a player is not acting out these events, a user may participate in "activities", i.e., non-events.

Activities include actions performed by a player character that are not events of a particular interactive multiplayer story. A player may initiate an activity and control the outcome of the activity. Using the Batman example, while a player may be required to complete a series of events written for the interactive story Batman, in between such events, a player can chat with other users' avatars in Gotham, walk around and explore Gotham, and shop for virtual products such as new outfits for the user's avatar and new furniture for the avatar's home, etc.

In one aspect, a system that enables player character interactions in an interactive multiplayer game or story includes a user interface that enables a user to control a player character in the interactive multiplayer game or story. The system also includes a processor, in communication with the user interface, that i) tracks the actions of the player character within the interactive multiplayer game or story, and ii) transfers control of the player character from the user to the processor during an interaction event with a second player character in response to an interaction condition.

The interaction event may include a social interaction. The second player character may be controlled by a second user via a second user interface. The interactive multiplayer game or story may control the actions of the second player character during the interaction event. The processor may prompt the user to initiate the interaction condition. Prompting may include presenting a request for user input via the user interface to initiate the interaction condition.

An interaction condition may be automatically initiated by the processor based on interaction rules. The interaction rules may be configured by the user. The interaction rules may include at least one of type of interaction, location of interaction, time of interaction, a characteristics of the entity being interacted with, user acceptance of the interaction condition, proximity between the first and second player, and proximity of the first player in relation to the location of interaction associated with an event or activity. An interaction event may include at least one of a communication, a physical interaction, a mental interaction, a social interaction, speaking, writing, acting out a part of a story line, performing an action, and performing a sequence of actions. The processor may transfer control of the player character to the user upon completion of the interaction event.

BRIEF DESCRIPTION OF THE DRAWINGS

The foregoing and other objects, features, advantages, and illustrative embodiments of the invention will now be described with reference to the following drawings in which like reference designations refer to the same parts throughout the different views. These drawings are not necessarily to scale, emphasis instead being placed upon illustrating principles of the invention.

FIG. 3 is a functional diagram of an interactive story showing a mapping of multiple events to multiple player characters according to an illustrative embodiment of the invention.

DESCRIPTION

As described above in the summary, the disclosure is generally related to systems and methods for providing a user with an interactive multiplayer story and/or a virtual world application.

Figure 1:
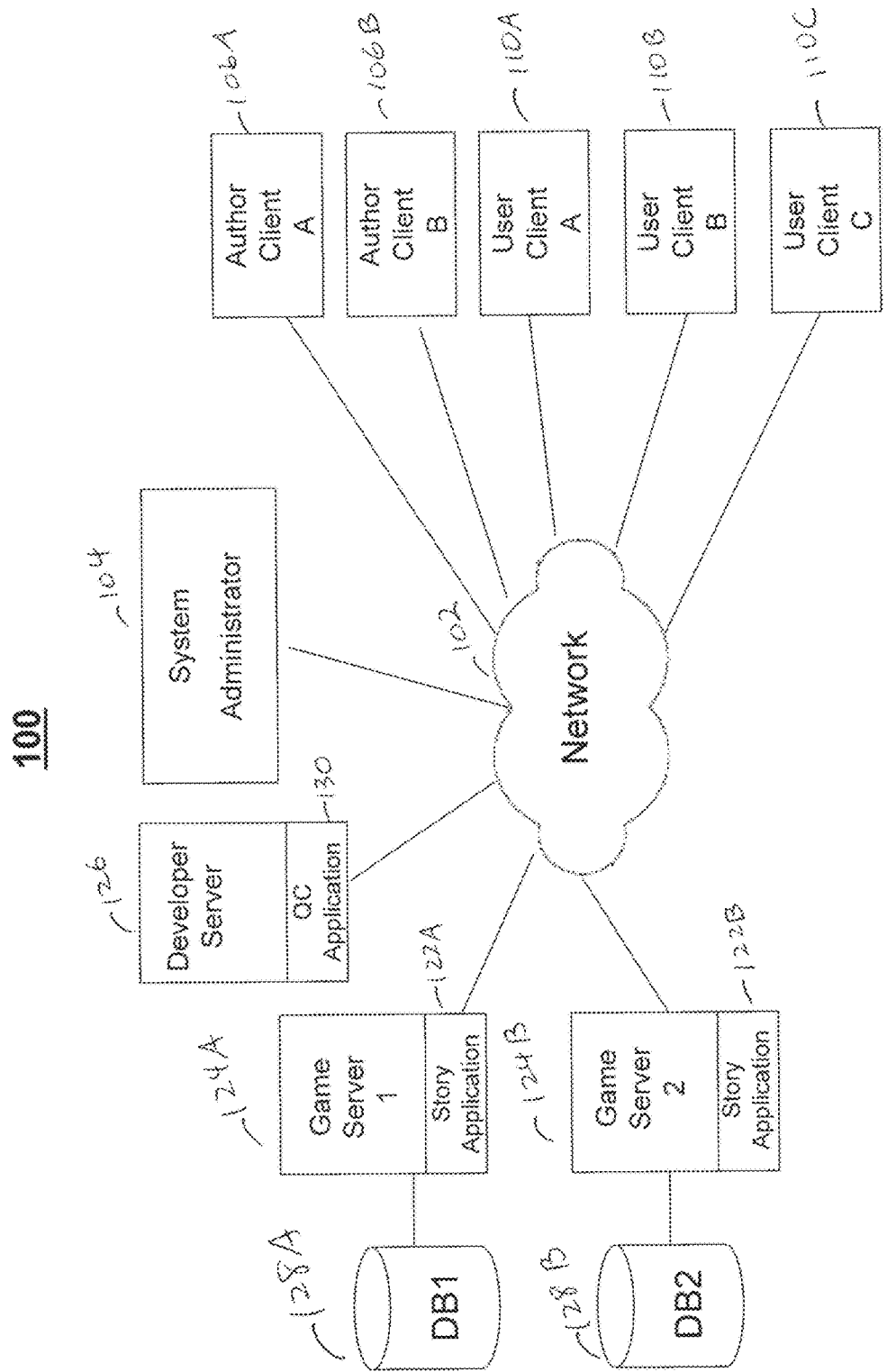
FIG. 1 is a network diagram of an interactive multiplayer story system according to an illustrative embodiment of the invention.

FIG. 1 is a network diagram of an interactive multiplayer story system or framework 100 according to an illustrative embodiment of the invention. The system 100 includes a network 102, a system administrator 104, a development server 126, a game server 124A, a story application 122A, a database 128A, a game server 124B, a story application 122B, a database 128B, an author client 106A, an author client 106B, a user client 110A, a user client 110B and a user client 110C.

The network 102 may include a data network, packet data network, circuit switched network, wireless network, Public Switched Telephone Network (PSTN), or any network capable of exchange information between a sender and receiver. The system administrator 104 may communicate with the servers 124 and the clients 106 and 110 using the network 102. The system administrator 104 may retrieve data from or send data to the servers 124 and clients 106 and 110. Furthermore, the system administrator 104 may communicate with the database 128A and the database 128B through the game servers 124A and 124B, respectively, or directly through the network 102.

Each of the game servers 124A and 124B may include a plurality of servers. These severs, 124A and 124B may be any computing system, such as described with respect to FIG. 2, or portions of a computing system, capable of delivering a service, such as a gaming service, to a user or a plurality of users. The development server 126 may communicate directly with other servers, such as the game server 124A or database 128. Such communication may be done through the network 102. In one embodiment, the game servers 124A and 124B can host the story applications 122A and 122B, respectively. In another embodiment, the game servers 124A and 124B are connected to the databases 128A and 128B, respectively, to allow for electronic communication.

The game servers 124A and 124B may include a web site and have a web application. Web applications may include applications developed based on .NET, Java, SAP, Siebel, Oracle, web services and/or other suitable web-based platforms. The game server 124A or 124B may be a computer server implementing an instance of the story application 122A or 122B, and may be operated as a web server.

In some embodiments, the story application 122A and/or 122B is accessible by multiple users. Users may be persons that perform various roles associated with the story applications 122A and/or 122B, such as the system administrator 104, the author 106A and the user (or player) 110A, and developers. Each user may access and/or interact with the story application 122A or 122B via the network 102 using a web browser implemented on a client machine 110A or 110B or via a direct interface. User interaction with the story application 122A or 122B may include configuring and/or executing games applications 122A or 122B, and performing related activities. Related activities may include creating an avatar and/or player character, purchasing access to story applications or modules, reviewing information related to the story applications 122A and/or 122B, and/or communication with a game administrator and/or other players.

Each of the author clients 106A, 106B, the user clients 110A 110B and 110C may include a plurality of clients. These clients can be any computer systems and applications capable of accessing remote information on a server, such as servers 124A and/or 124B. In one embodiment, the author client 106A and 106B are clients used by authors or game level designers or other content publishers for interacting with the servers and/or the system administrator 104 through the network 102. For example, an author may develop a virtual actor, i.e., a "vactor", an item, a dungeon, an adventure, a story line, and then upload and/or publish this data to the game server 124 and/or story application 122 to be used by players. Similarly, the users clients 110A, 110B and 110C may enable players to interact with the servers 124A and 124B, and/or with the system administrator 104 through the network 102.

The system administrator 104 may monitor an on-going story application 122, gaming environment, and/or an avatar's social interactions within a virtual world. For example, if a user has committed a certain prohibited behavior, the system administrator may decide to expel him or freeze his account for some amount of time. Additionally, the system administrator 104 may provide technical support for all back-end servers and frontend applications to ensure that the infrastructure is sufficient to support an interactive multiplayer story system. For example, when the game server 124A goes offline, the system administrator 104 may migrate workload from the game server 124A to the other game server 124B, while conducting business recovery on the game server 124A.

The development server 126 may process content submitted by the author 106A and/or the author 106B. A submission may be a story or an excerpt of a story for a game or an adventure, or a level created by a level designer, and/or merchandise. Additionally, these submissions can be stored in the database 128A. In one embodiment, the development server 126 includes, as a quality control, application 130. The quality control application 130 may be operated and/or used by one or more system administrators or quality control reviewers, who review submitted gaming data (e.g., dungeon, adventure, story line, item, character, and so on) and determine whether the data quality is adequate for publication and/or use as part of gaming applications 122A and/or 122B. The adequate and selected submissions may then be stored in the database 128 and/or another database, such as publication database 312. One submission may also be distributed among various databases. The selected and/or approved submissions may then be offered for purchase and/or use by end users. Depending on the game, adventure, book, and/or other published content selected and/or purchased by a user, the game servers 124A and/or 124B may retrieve data from databases, such as database 128A or 312, to install and run story applications 122A and/or 122B to serve user clients.

Figure 2:
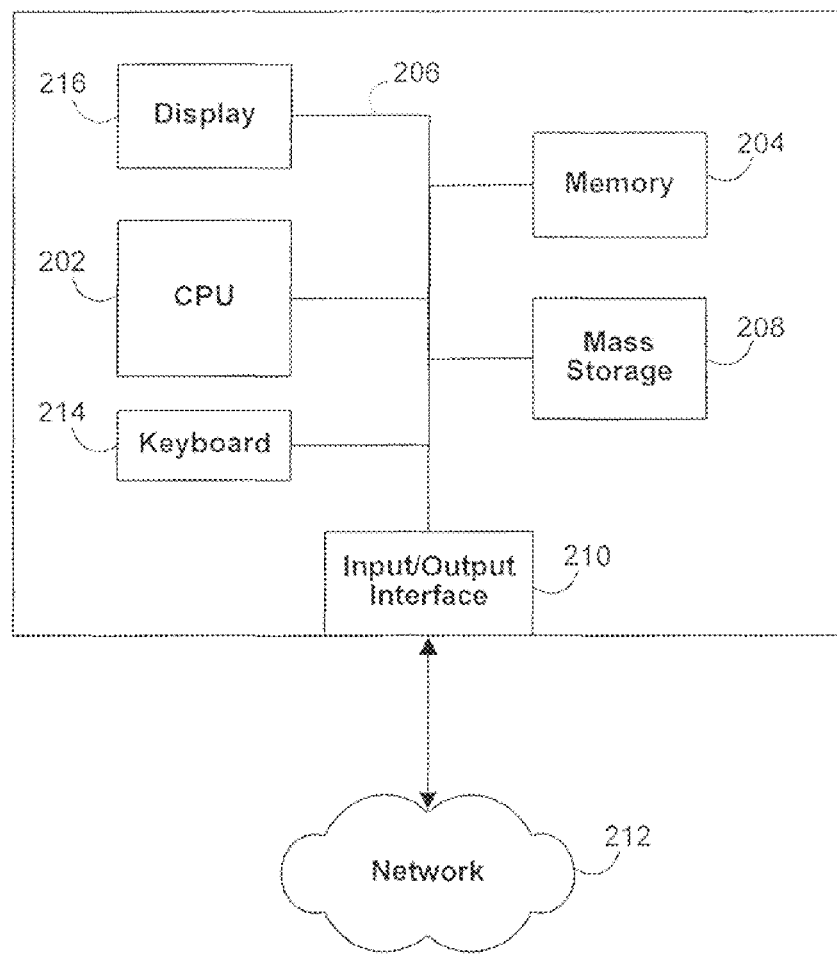
FIG. 2 is a functional block diagram of a general purpose computer system according to an illustrative embodiment of the invention.

FIG. 2 is a functional block diagram of a general purpose computer accessing a network according to an illustrative embodiment of the invention. The system administrator 104, the development server 126, the game server 124A, the story application 122A, the database 128A, the game server 124B, the story application 122B, the database 128B, the author client 106A, the author client 106B, the user client 110A, the user client 110B and the user client 110C may be implemented as a general purpose computer 200 shown in FIG. 2.

The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read-only memory. The computer 200 also includes the mass storage device 208 having, for example, various disk drives, tape drives, etc. The main memory 204 also includes dynamic random access memory (DRAM) and high-speed cache memory. In operation and use, the main memory 204 stores at least portions of instructions and data for execution by the CPU 202.

The computer system 200 may also include one or more input/output interfaces for communications, shown by way of example, as interface 210 for data communications via the network 212. The data interface 210 may be a modem, an Ethernet card or any other suitable data communications device. To provide the functions of a computer 104 according to FIG. 1, the data interface 210 may provide a relatively high-speed link to a network 212 and/or network 102, such as an intranet, internet, or the Internet, either directly or through an another external interface. The communication link to the network 212 may be, for example, optical, wired, or wireless (e.g., via satellite or 802.11 Wi-Fi or cellular network). Alternatively, the computer system 200 may include a mainframe or other type of host computer system capable of web-based communications via the network 212 and or network 102.

The computer system 200 also includes suitable input/output ports or may use the Interconnect Bus 206 for interconnection with a local display 216 and keyboard 214 or the like serving as a local user interface for programming and/or data entry, retrieval, or manipulation purposes. Alternatively, server operations personnel may interact with the computer system 200 for controlling and/or programming the system from remote terminal devices via the Network 212.

The components contained in the computer system 200 are those typically found in general purpose computer systems used as servers, workstations, personal computers, network terminals, portable devices, and the like. In fact, these components are intended to represent a broad category of such computer components that are well known in the art. Certain aspects of the invention may relate to the software elements, such as the executable code and database for the server functions of the development server 126, game server 124, administrator 104, databases 128, and/or clients 106 and 110.

Figure 3:
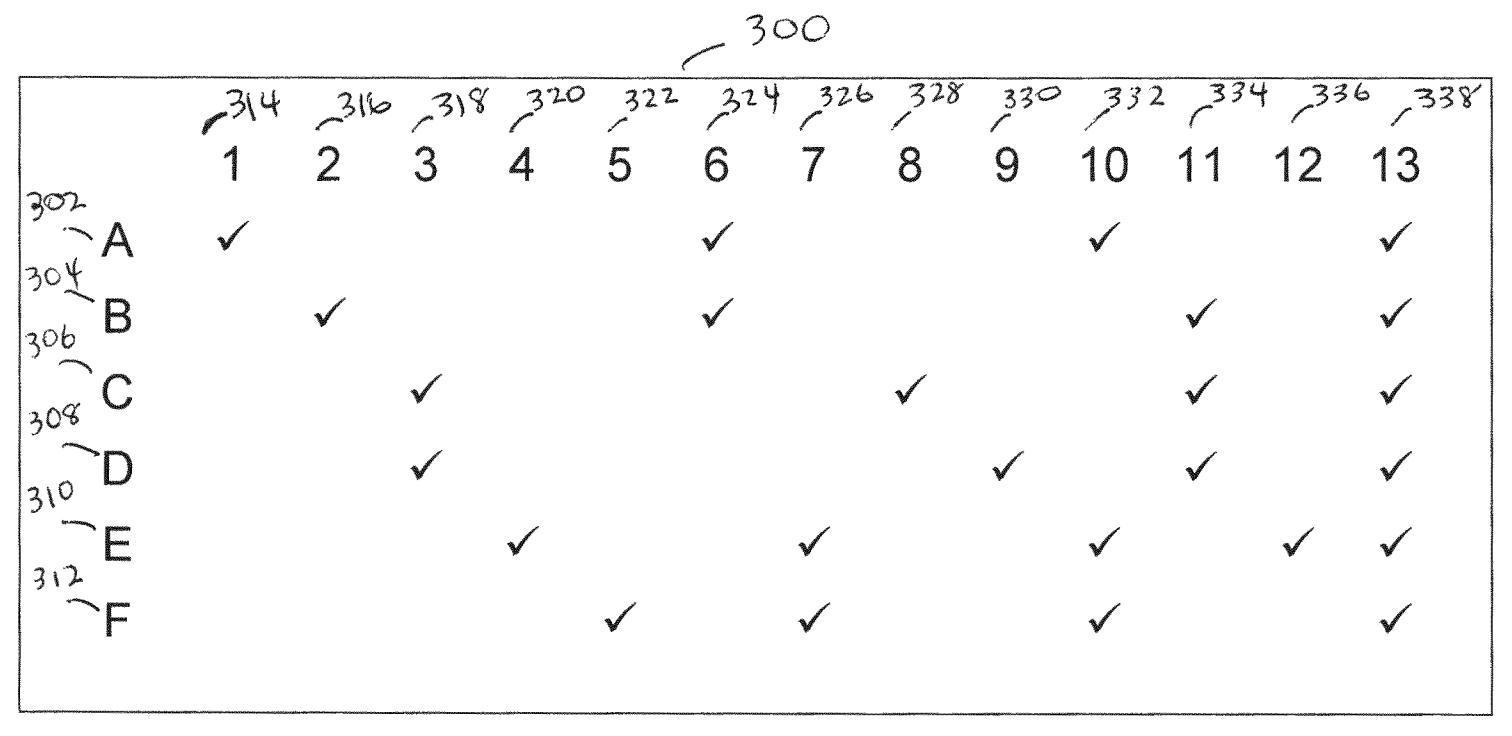

FIG. 3 is a functional diagram 300 of an interactive multiplayer story showing a mapping of multiple events to multiple player character roles according to an illustrative embodiment of the invention. The diagram 300 includes a vertical axis of roles A through F (302-312) of characters that players can choose to play in a role playing game and/or interactive story. The horizontal axis includes events 1-13 (314-338) that make up a story line and/or plot of the interactive story where the events happen to and/or are acted out by the player characters in various roles.

Player characters may assume one of the roles 302, 304, 306, 308, 310, and 312 (i.e., . . . , roles A-F). The events 1-13 in the story that happen to or are acted out by the characters may be controlled by various players. Such virtual actors may be referred to as avatars or player characters (PCs). Characters controlled by the story application 122 may be referred to as non-player characters (NPCs). NPCs in an interactive story and/or movie may also be referred to as virtual actors or "vactors." Events may happen to individual or multiple avatars. The story application 122 may wait for avatar proximity or call multiple avatars to an event to initiate the event.

One example or metaphor may be a movie. The camera jumps from place to place and shows one or more players or viewers event happening to the characters in the movie. A two-hour movie can describe a series of events separated by vast amounts of time and space. In the movie, an activity or non-event that happens between events is left out to move the story to a conclusion in ninety minutes. In a virtual adventure run by an interactive multiplayer story application 122, the in world time spent by an avatar may include many non-events or activities such as talking to friends, going on dates, playing games, and so on. After some time has passed, the story application 122 may look for PCs that are destined and/or ready to interact in an event, and then initiate a meeting to act out the event.

The difference between a PC's behavior during an event vs. during a non-event may be that the story application controls an avatar's actions, like a director controls an actor's action while, during a non-event, the player controls their avatar's actions. For example, Jason Bourne springs into Kung-fu action during an event, and then becomes a lonely confused young man searching for his identity.

An avatar may participate in and/or be part of many stories at the same time. In some instances, the stories are independent. However, in other instances some stories may be related in some way. For example, an avatar may be in numerous stories concurrently such as, without limitation, the following:

1) become a great golfer
2) get married and have a family
3) have a wild adventure with a brunette
4) have a wild adventure with a blond
5) be James Bond in a spy story
6) be Indiana Jones in an action story
7) be a Yankees fan in a baseball story An avatar may participate in multiple non-related stories that are in progress at the same time and/or running concurrently.

Referring again to FIG. 3, a first avatar may assume role A and thus particular in events 1, 6, 10, and 13 of the interactive story. A second avatar may assume role B and participate in events 2, 6, 11 and 13. During event 1, only the first avatar may participate in the event. However, during event 6, both the first and second avatar participate in the event. For example, the story may be Batman where role A is Batman and role B is the Joker. The first avatar may become Batman during event 1. During event 6, the first avatar, acting in the role of Batman, encounters the second avatar, acting in the role of the Joker, where the event includes a Bank robbery by the Joker.

Because a story may have multiple roles that a player can choose from, a player may repeat the same story with different roles. If a player were to repeat a story using a role different from what previously used to play in the same story, the story application 122 or adventure engine may generate a new instantiation of the story. The sequence of events and/or total number of events may be the same or different for this new role when compared to the events experienced the previous role. For example, in some events of the Batman story, only Batman and Joker are needed to play an event. However, in other events, only Batman and Rachael Dawes are needed. Because events requiring Rachael Dawes may not require the Joker, the set of events experienced by an avatar in these roles would be different.

The number of events the avatar participates in may also differ as there may be more events that require the Joker role (e.g., role B) as opposed to Rachael Dawes (e.g., role C). Therefore, depending on the selected role, the same avatar or another avatar of a player may experience different sets and/or sequences of events in the same story. Accordingly, because different avatars may assume different roles A-F in a story, two avatars and/or players may not have the same experience in a story. Because what an avatar may experience in a story can be different from what another avatar may experience in the same story, the interactive multiplayer story application 122 can provide each player of the interactive multiplayer story system with a personalized experience, making the experience more realistic because events occurring to an avatar are unpredictable and dynamically initiated. Furthermore, because the same user may experience different sets of events and/or sequences of events using one or more avatars in different character roles, the interactive multiplayer system advantageously provides users of the system with adventuring possibilities that not provided by existing RPGs.

Figure 4:
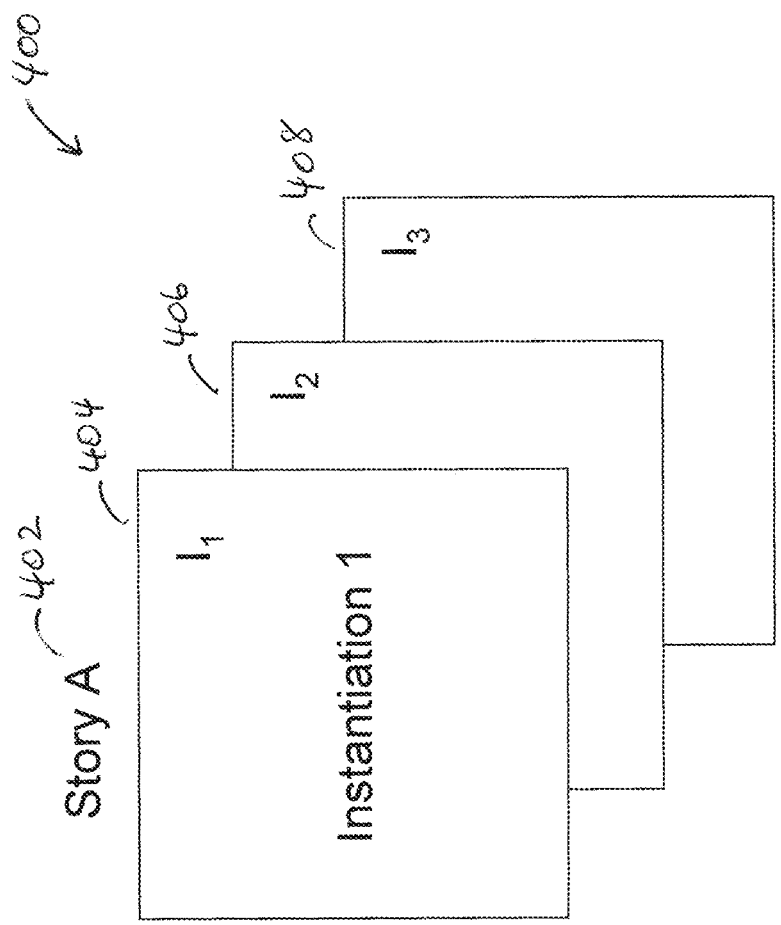
FIG. 4 is a diagram illustrating multiple instantiations of a story generated by a story application according to an illustrative embodiment of the invention.

FIG. 4 is a functional diagram showing multiple instantiations 404, 406, and 408 of a story 402 generated by the story application 122 according to an illustrative embodiment of the invention. In certain instances, the story application 122 may provide an interactive story 402 to many players at various times. Thus, there may be many players that want their avatar to act out, for example, role A at the same time. One approach to ensuring that multiple avatars are able to assume a particular role is to provide multiple instantiations or versions 404, 406, and 408 of a story whereby a first avatar assumes role A of a story in a first instantiation 404, a second avatar assumes role A in a second instantiation 406, a third avatar assume role A in a third instantiation 408, and so on until the story application 122 provides each of the players desiring their avatar to assume role A with the opportunity to assume role A in a particular story 402.

A player may have multiple avatars and have each avatar assume a different role in an instantiation of a story. Avatars may assume different roles for different events in an instantiation of a story. Using the Batman example, the avatar who assumes the role of Batman in one event of an instantiation may assume the role of the Joker in another event of the same instantiation. Similarly, an avatar may assume different roles in different instantiations. This way, a player can experience the same story or event from multiple perspectives as their avatar or avatars take on multiple character roles, making the virtual world more interesting and dynamic.

To determine whether a new instantiation 404 needs to be created, the story application 122 may assess whether one or more trigger conditions exist, such as whether a different set of players are needed to act out an event, whether there exists an opportunity to bring in new players to an event, and/or whether it is more advantageous to first allow players to complete one event over others. Therefore, $I_1$ 404 and $I_2$ 406 may differ at least because different sets of players were brought together to act out one or more events of each instantiation. Instantiations 404, 406 and 408 may further differ because the series of events of each instantiation of the story 402 may be played in a different sequence. For example, the story Batman may have been purchased by 1000 players, some of whom wish to be Batman, while others wish to be the Joker or Rachael Dawes. At any moment in time, the story application 122 may bring together players who are assuming these roles into the story 402 Batman, and allow these players to act out an event 1-13 (See FIG. 3) of Batman. There may be numerous instantiations 404, 406, and 408 of the story 402 because the story application 122 may bring together numerous different sets of players to act out events of the story 402 (e.g. the Batman story). Also, the events of the different instantiations may occur at different times or date depending on when a condition of bring multiple avatars together are satisfied.

In instantiation 404 for example, a first set of avatars may be brought together to accomplish a first event. These avatars may include $P_A$, Batman, $P_B$, Joker, and $P_C$, Rachael Dawes. Similarly, in $I_2$ 406, a second set of players may be brought together to accomplish the first event. These players may be $P_D$, Batman, $P_E$, Joker, and $P_F$, Rachael Dawes. Finally, in $I_3$ 408, a third set of players may be brought together to accomplish the first event. These players may be $P_G$, Batman, $P_H$, Joker, and $P_I$, Rachael Dawes.

The Batman story 402 may contain, for example, various events 1-13 for avatars to participate in. The sequence of these events in $I_1$ 404 may also be different from the sequence of events in $I_2$ 406 and may further be different from the sequence of events in $I_3$ 408. Although some events may only be triggered based on the completion of others (e.g., the event in which the Joker is put in jail has to occur before the event in which the Joker escapes from jail), certain events may be temporally independent from one another (e.g., Rachael Dawes may be investigating the identity of Batman irrespective of when the Joker is put in jail or escapes). Additionally, because some events may not require all avatars assuming the roles of the story 402 to be available and ready to play, the story application 122 may first initiate an event in which only two roles are needed (e.g., event 6 of FIG. 3) since it may be more feasible to identify two players who want to assume two roles rather than three players who want to assume all three roles.

At least because the story application 122 of the adventure engine dynamically identifies opportunities for players to be brought together to act out an event, players of a story advantageously no longer have to wait for other players to become available to play an event or chapter or no longer have to play events of a story in a predefined sequence. In some embodiments, players and/or avatars may not be allowed to look ahead at the events left to play as the story application 122 of the adventure engine dynamically initiates a next event. Accordingly, such unpredictability may enhance a player's virtual world experience while playing an interactive multi-player story.

In one embodiment, the story application 122 may create and/or provide instantiations of an event of a story in additional to, or as an alternative, to instantiations of a story. The story application 122 may track the individual progress of an avatar using an avatar-specific story line.

Additionally, to accommodate multiple players wishing to assume the same role in a story at the same moment in time, the application 122 can assign the avatars of these players to different instantiations of the story to avoid conflicts. That is, at any particular moment in time, two players may decide to have their avatars assume the role of Batman. To avoid having both avatars playing as Batman in the same event, the application 122 can prevent such a conflict from happening by initiating a new instantiation so that both avatars can play as Batman simultaneously without interfering with one another. Additionally, if avatars are identified and brought together to act out a particular event or scene in one instantiation, the application 122 may prevent other avatars from interrupting the event by assigning these other avatars to different instantiations of the same story.

For instance, avatars may simultaneously believe to have made an eye contact with the same avatar in a virtual social setting, such as in a virtual night club. In some instances, the application 122 can avoid such confusion or a conflict by providing the social interaction opportunity to the first two players, $P_A$ and $P_B$ that make eye contact, while preventing a third avatar $P_C$ from interfering. To prevent $P_C$ from interfering, the application 122 can depict on a display a text or graphical bubble above $P_A$ and $P_B$ to indicate that these players are permitted to participate the social activity. Alternatively, a vactor may approach $P_C$ and explain to him that the social opportunity has been given to $P_A$ and $P_B$. In other embodiments, $P_C$ may be taken to participate in alternate events or to a different part of the virtual world, or allowed to participate in a different instantiation.

Figure 5:
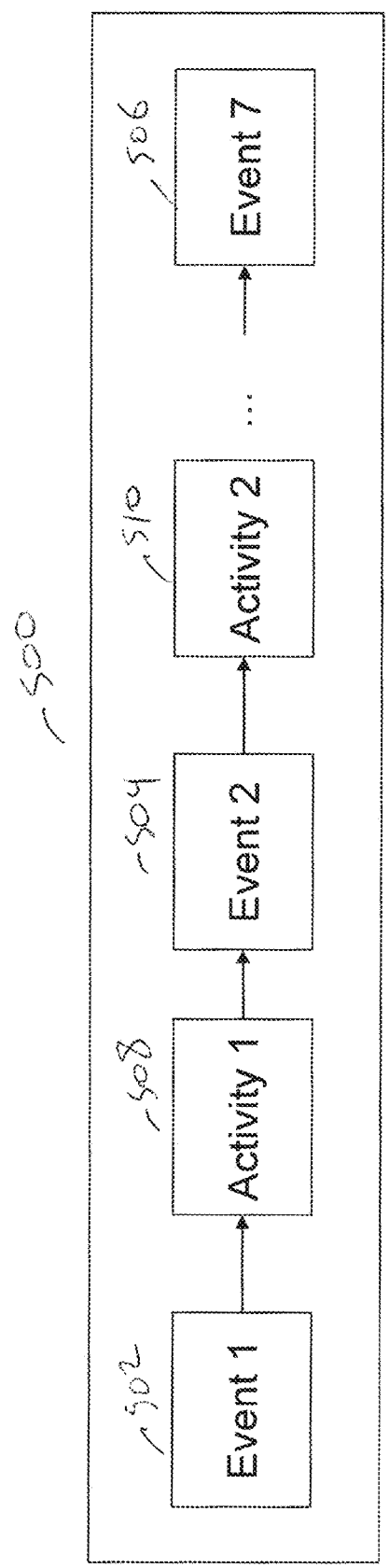
FIG. 5 is a diagram showing various events of a story associated with a player character according to an illustrative embodiment of the invention.

FIG. 5 is a diagram showing an avatar-specific story line 500 associated with a particular avatar including multiple events 502, 504, and 506 of a story and activities 508 and 510, according to an illustrative embodiment of the invention. The avatar may have assumed, for example, role A in a story 402. In one embodiment, the story application 122 tracks the progress of an avatar by tracking whether certain events are completed or not. FIG. 5 illustrates that the avatar-specific story line 500 includes at least seven story related events 502-506 and non-story related events, or activities 508 and 510. The avatar may have completed event 502 and is ready to act out event 504. Event 502 may have corresponded to event 1 of instantiation 404 of story 402. However, instead of performing event 2 of instantiation 404, the story application may have avatar participate in event 2 of instantiation 406. There may be numerous reasons why a different instantiation is used. For example, the player for avatar may have not played the interactive story for several days, resulting in event 2 of instantiation 404 having been already performed by another avatar. Thus, when the player resumes play with avatar, the story application 122 provides event 2 of instantiation 404 to avatar. Thus, event 504 of the avatar-specific story line 500 would correspond to event 2 of instantiation 404.

From the player's perspective, it may not be relevant which instantiation of a story is used to act out a particular event as long as the player or his/her avatar for his player character is able to progress through the events 502-506 of his/her avatar-specific story line 500. In one embodiment, the story application 122 displays a version of the story line 500 to a player associated with his/her avatar so that the player is able to monitor the progress of his/her avatar through a particular story line 500. The story line 500 may be displayed in any number of forms including, for example, a sequence of chapters (corresponding to each event 502-506). As a player completes an event, an indicator such, for example, closing a chapter cover, may be presented to indicate that a portion and/or event of a story is completed. Other visual, graphical, and/or audio-based indicators may be used to show completion of an event.

In some embodiments, future events or events yet to be performed may be obscured or hidden to enhance the unpredictability of a story line 500. The story application 122 may initiate an event for a player dynamically, or based on the satisfactions of one or more trigger or event conditions. The selection of avatars and/or player characters to participate in an event or instantiation of an event may depend on certain event conditions such as, without limitation: proximity of avatars to one another in a virtual world; whether certain avatar and/or players are "friends" or have designated each other as part of a group, guild, affiliation, or social network; avatar demographics, player demographics (e.g., age, gender, race, ethnicity, and the like), player preferences (e.g., game background), avatar preferences; experience of players and/or avatars in virtual world, and priority of stories that a player wants their avatar to participate in.

In some embodiments, the game application 122 controls when an event, a portion of an event, and/or certain avatar actions during a non-event is initiated based on upon the occurrence of a trigger condition. With respect to FIG. 3, an avatar may participate in activities (e.g., non-events) that are dynamically facilitated by the game application 122 while the avatar is not participating in a story-related event. For example, an avatar may visit a virtual meeting place such as a bar to meet other avatars and players. The game application 122 may assume control of an avatar for certain activities and/or events to enable the avatar to perform in an extraordinary manner and/or in a manner of a character within a story line. For example, an avatar assuming the role of Batman may be controlled, at least temporarily, in a manner to enable the avatar to leap twenty feet from one building to another. Once a particular event, activity, and/or non-event interaction is completed, the game application 122 may restore control of the avatar the player.

A player may determine when his/her avatar participates a story and/or event of a story. As described in relation to FIG. 7, a player may customize an avatar's virtual world setting. One of such settings may allow the user to pause, cancel, and/or delay an event and/or story line or other activity. In one configuration, a player can decide whether or not the game application 122 can take control of an avatar to initiate an event of a story. If the story mode is paused, delayed, and/or turned off, the avatar may be free to participate in non-events and activities that are not part of a story even if the game application 122 determines that the avatar can participate in a story-related event. This feature may advantageously allow an avatar to perform non-events and activities without interruption from the game application 122 which may be continuously assigning an avatar to various events of one of more story lines. In another configuration, the game application 122 may allow a player to prioritize certain stories. For example, avatar may be participating in three stories simultaneously. The player of the avatar may designate a first of the three stories as highest priority so that the game application 122 ensures that the avatar performs events associated with the first story in preference to the second and third stories. In one configuration, the game application may pause the avatar's actions in one story in order to perform an event in a higher priority story. Once the event of the higher priority story is complete, the avatar may be returned to the event of the lower priority story. It may be preferable for a player wishing to complete a particular story as soon as possible and, therefore, want to be interrupted by the game application 122 to initiate an event of the particular story. In another configuration, the game application 122 may query a player for authorization before including the player's avatar in a particular story and/or event of a story.

In some instances, a player may purchase the right to pause, delay, and/or turn a story on or off. The game application 122 may enable a player to choose to pause, skip an event, skip a portion of a story, move forward or back in a story, cancel, and/or restart a story. In other instances, depending on the nature of the interactive story and a player's setting for the story, the game application 122 may override certain player selections including a player selecting to pause, skip an event, skip a portion of story, move forward or backward in a story, cancel, and/or restart a story.

Figure 6:
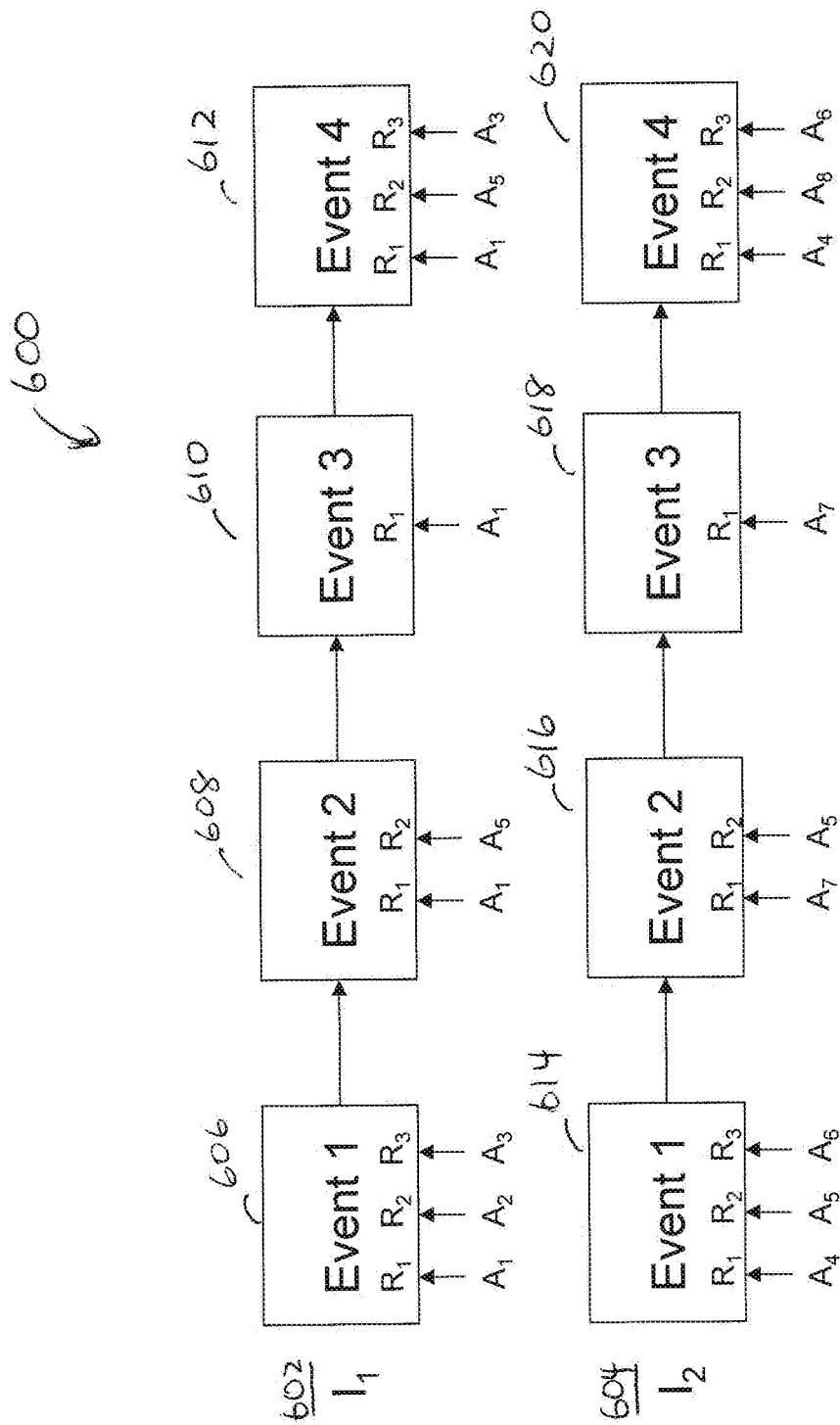
FIG. 6 is a diagram showing first and second story lines where the first story line is associated with a first instantiation of a story and the second story line is associated with a second instantiation of a story according to an illustrative embodiment of the invention.

FIG. 6 is a diagram 600 including two instantiations 602 and 604 of a story according to an illustrative embodiment of the invention. The first instantiation 602 includes a story line having events 606, 608, 610, and 612 (story events 1-4). The second instantiation 604 includes a story line having events 614, 616, 618, and 620 (story events 1-4). Each event may require that certain character roles be acted out during that event. For example, event 1 (e.g., event 606 and 614) requires roles $R_1$, $R_2$, and $R_3$. Event 2 (e.g., events 608 and 616) may require character roles $R_1$ and $R_2$. Event 3 (e.g., events 610 and 618) may require character role $R_1$. Event 4 (e.g., events 612 and 620) may require character roles $R_1$, $R_2$, and $R_3$.

The story application may assign certain avatars to certain roles in one or both of the instantiations 602 and 604 of a story. For instance, the avatar $A_2$ may be assigned to event 606 (event 1 of instantiation 602) to participate in that event in the role $R_2$. However, the story application may then assign avatar $A_5$ to the role $R_2$ for event 608 (event 2 of instantiation 602). The story application 122 may assign the same avatar $A_1$ to act out the same role $R_1$ for every event of an instantiation 602. However, in some instances, the story application 122 may assign different avatars $A_4$ and $A_7$ to act out different events of an instantiation 604 of a story.

The story application 122 may continuously identify avatars and/or players to assume character roles that are necessary to initiate an event. The temporal sequence of events completed for the instantiation 602 may be different from the sequence of events completed for instantiation 604. This flexibility allows the game application 122 to identify available players of various avatars at any moment in time so that the system may initiate events for those players at that moment, without requiring the players to wait for other players and their avatars to become available to complete an event. In fact, the story application 122 may create a new instantiation so that a play may at least be able to play certain events of a story immediately, without having to wait for any other players becoming available. In one embodiment, the story application 122 can use an NPC to assume a role in an event of a story where an avatar is not available.

In an illustrative situation where, for example, a thousand users have purchased the right to play the story Batman, there may be 50 users signed onto the game server 124A and/or 124B, and the database 128A may currently contain only seven events for the story Batman, though more events may be added later if additional submissions of content are received and approved for sale. More characters may also be added, and therefore, events and/or storylines that are designed to utilize these characters may also be added into the database 128A. For example, new characters, such as Harvey Dent, the new district attorney, and Alfred, Batman's advisor, may be added to the Batman story later as new submissions of characters and/or events are published and integrated into the story by the story application 122.

Event 608 may correspond to a scene in the Batman story where Batman rescues Rachael Dawes from Joker. Therefore, to complete this event 608, the game application 122 may check database 128A and or 128B to search for avatars currently available for playing the event 608 and identify players who wish to be Batman, Joker and Rachael Dawes. Once the story application 122 identifies these players, the story application 122 may automatically bring these players together to act out the various actions of event 608. The virtual world environment for event 608 may largely depend on or be similar to the scenes in the movie Batman, making the story experience more realistic and familiar as most players of the Batman story may have seen the movie.

Other animations and/or graphical designs may also be included in addition to scenes like the movie. The game application 122 may further automatically generate certain virtual world features for the event 608 based on each player's user profile or settings, such that the virtual world environment is tailored to each player, making the experience more personalized. For example, if a player indicated in his/her user profile and/or setting that he/she dislikes having a dark background, albeit Gotham from the movie Batman has a dark setting, the story application 122 may render the background color and/or any other virtual world features associated with Gotham according to the user's preferences. For example, the story application 122 may create a brighter background for the Batman story (for one player) while other players may still see a darker background for the story. That is, players of the same event, instantiation of a story, and/or story may experience different and personalized virtual world designs.

In response to a player whose avatar is playing the role of Batman and wanting to finish the Batman story, and if the game application 122 is unable to identify two other players who wish to play the character Joker and Rachael Dawes, the game application 122 may automatically bring the player to event 610 as this is a single player event and its occurrence may not be dependent on the completion of other events.

Such mechanism can advantageously reduce the amount of time a player must spend waiting on other players to become available. Alternatively, the game application 122 may identify one other player who wishes to play the character Joker and bring the two players to, for example, event 608 because this event only requires one other character. In some instances, a new instantiation, such as instantiation 604, is created by the story application 122 to accommodate a player who wishes to finish a story sooner. The story application 122 may then track the completed events and determine the remaining events for this instantiation of the Batman story. In the future, the story application 122 may identify available players to finish the remaining events, such as events 614, 616, 618, and 620.

In another example, a player $P_A$ may have completed most of the events for the Batman story and is currently participating in activities or non-events. The story application 122 may track $P_A$'s progress through the story line of instantiation 602 of Batman and determine that $P_A$ has event 612 left in the story. The story application 122 may then actively search for two other players who might be available and wish to play the remaining characters in event 612. Once such players are identified, the event/scene generator 902 of the story application 122 may generate the necessary graphics and story related features of the virtual world for event 612. The bulletin 1002 for PA, which contains the upcoming events, may include event 612 and may start flashing on $P_A$'s screen to indicate to $P_A$ that event 618 is ready for him/her to play. Upon $P_A$ selecting event 618, $P_A$ may exit out of the current activities, or non events, and the story application 122 may automatically bring in all three players to act out the various actions in event 618 in roles $R_1$, $R_2$, and $R_3$. After $P_A$ finishes event 618, the story line tracker 908 (See FIG. 9A) may receive the appropriate subroutine values and/or parameters so that the story application 122 can return $P_A$ back to an activity or another story prior to participating in event 618.

Other conditions or parameters used for initiating a new instantiation of a story may also include new additions of events to a story. For example, while most instantiations of the Batman story have seven events, at some time, a new event may be added to the database 128A and/or 128B. For some events, a new character, Harvey, may be needed in addition to Batman, Joker and Rachael Dawes. The story application 122 may generate a new instantiation or version of the Batman story that includes this new event. Players who have either completed the Batman story or have completed various events of the Batman story in various instantiations of the Batman story may also be given the opportunity to participate in this new event of the new instantiation.

Figure 7:
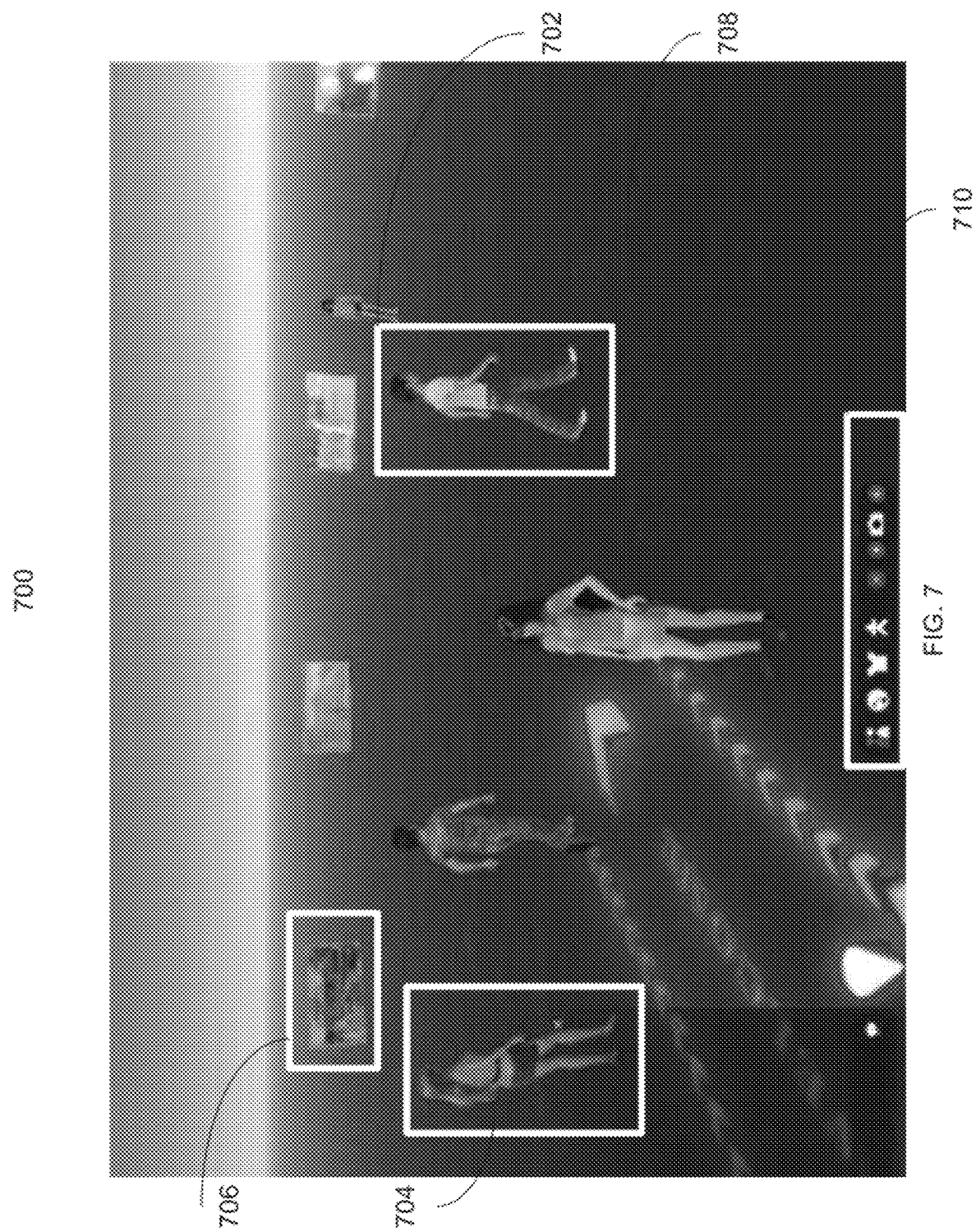
FIG. 7 is a screen shot of a virtual environment according to an illustrative embodiment of the invention.

FIG. 7 is a screen shot 700 of a virtual environment according to an illustrative embodiment of the invention. Screen shot 700 includes a male avatar 702, a female avatar 704, an event selecting window 706, a virtual world 708 and a tool bar 710. The screen shot 700 may be displayed on a monitor, a TV, a cell phone display or on any other visual output devices.

In some embodiments, avatars as depicted in the screen shot 700 are controlled by new players who have just entered the virtual world. To assist the new players in learning about the various interactions they can control via their input devices, a link to a tutorial may be provided on the tool bar 710. Alternatively, or additionally, a vactor can interact with the new players and help them navigate in the virtual world. In other embodiments, a player character, or avatar, is alerted with the opportunity to help a new player. In such instances, a player controlling the player character can teach or help the new player about navigating in the virtual world and its various features. This way, existing players are provided with the social opportunity to interact with new players and to create new friendships as a result. In some instances, the tutorial is designed in a game or story format. The new players can play such tutorial games or stories for free to learn about the various features offered by the virtual world.

The male avatar 702 and the female avatar 704 may be displayed using 2D or 3D graphical representations of an avatar and/or player character. An avatar 702 may be a player-created player character that acts out various scenarios for a player. In one embodiment, an avatar is controlled by and/or represents the interactive multiplayer story. Avatar movements and interactions with other characters may be controlled by an input peripheral device, such as a keyboard, a mouse, a speech-controlled device and a game-specific controller, and/or a graphical user interface (GUI). At certain instances, the male avatar 702 and/or female avatar 704 may be temporarily controlled by the story application 122 to enhance a player's ability to interact socially with other player characters and/or avatars.

An event selecting window 706 may be positioned in front of the male avatar 702 and/or the female avatar 704. The window 706 may include a thumbnail window that displays an introductory view of an event that a player can choose. The event selecting window 706 may include, without limitations, an icon, a door, a text-based message, or any other like forms. The male avatar 702 and/or female avatar 704 may choose to participate in an event by selection of the event in the window 706.

The virtual world 708 may include any interactive multiplayer story in which an avatar may play and interact with NPCs, vactors, other player characters, and/or avatars. The designs and imaging of the virtual world 708 may include graphical representations of a fantasy world, real and/or fictional images of an object, or person, or a combination of these. The virtual world 708 may then be created by the means of 2D and/or 3D rendering or image stitching. The creators of the virtual world 708 may include software developers. Various designs of the virtual world 708, including objects, adventures, dungeons, characters, and the like, may be developed and/or submitted to the content producer 1402 (See FIG. 14A).

In one embodiment, the screen shot 700 contains a tool bar 710 to provide users with additional opportunities for social interactions or exploration, and may be positioned anywhere on a screen. The tool bar 710 may include buttons, prompts, sliders or any other graphical or auditory elements. In some embodiments, the tool bar 710 includes a messenger client, an option for changing outfits to adapt to a social scene, a pause button for temporarily stopping play in a game, a music player, and/or other interactive multiplayer story tools.

Figure 8:
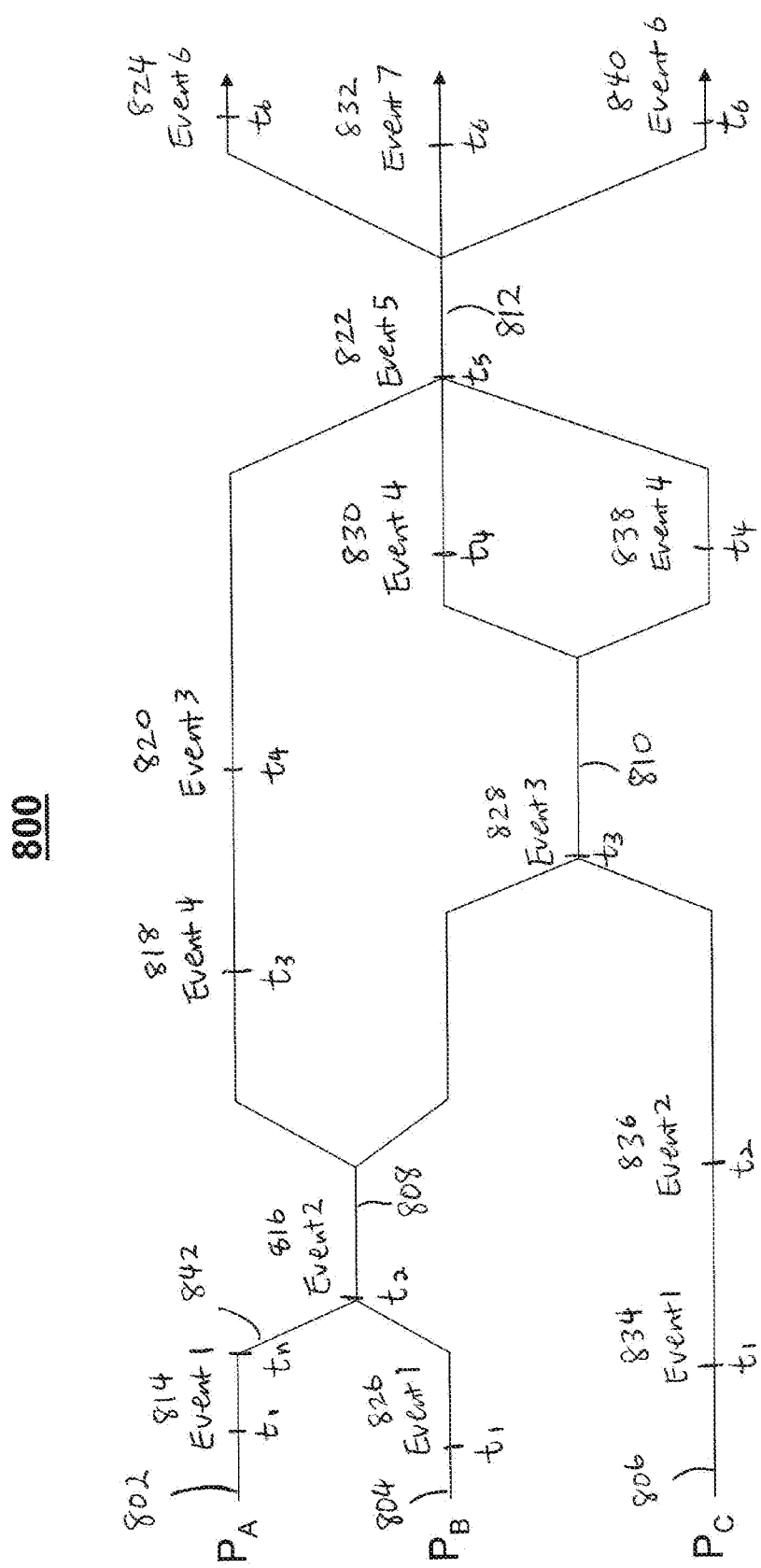
FIG. 8 is diagram illustrating story line management of multiple story lines associated with multiple player characters using a story application according to an illustrative embodiment of the invention.

FIG. 8 is a diagram 800 illustrating story line management of multiple avatar-specific story lines 802, 804, and 806 associated with multiple player characters ($P_A$, $P_B$, and $P_C$) by the story application 122 according to an illustrative embodiment of the invention. The story line 802 may be associated with the player character $P_A$ and include various events 812, 816, 818, 820, 822, and 824 (e.g., $P_A$ event #1 through $P_A$ event #6). The story line 804 may be associated with the player character $P_B$ and include various events 826, 816, 828, 830, 822, and 832 (e.g., $P_B$ event #1 through $P_B$ event #5, and $P_B$ event #7). The story line 806 may be associated with the player character $P_C$ and include various events 834, 836, 828, 838, 822, and 840 (e.g., $P_C$ event #1 through $P_C$ event #6). An event may include a scene, an adventure, a dungeon, short story, subplot, occurrence, an interaction with another player character or vactor, and/or any instance within a story line. Each event within a story line may occur at a particular time (e.g., t1, t2, t3, t4, t5, and t6). The time may be actual time, elapsed time, time relative to a particular player and/or story line, relative game time, and/or time associated with an event. For example, whenever a player logs onto the story application 122 to play their avatar, the story application 122 may use a timer or counter to keep track of the time spent by the player character within one or more story lines.

At certain instances, the various avatar-specific story lines 802, 804, and 806 may intersect or be linked by the story application 122 so that different player characters (e.g., avatars) can interact with each other during an event. Events 816, 828, and 822 may include linking periods 808, 810, and 812 where the various story lines 802, 804, and 806 intersect with each other. For example, during the linking instance, window, or period 808, the story lines of players $P_A$ and $P_B$ are joined so that both player characters can participate in event 816 ($P_A$ and $P_B$ the event #2). Event 816 may, for instance, be a bank robbery. Player character $P_A$ may be a policeman while player character $P_B$ may be a criminal. $P_A$ and $P_B$ may interact during the bank robbery where $P_A$ attempts to apprehend $P_B$. After shared event 816 is completed, the story application 122 ends the linking period 808 and returns each player $P_A$ and $P_B$ to their respective story lines 802 and 804. As another example, the story lines 802, 804, and 806 are linked together during linking period 812 so that player characters $P_A$, $P_B$, and $P_C$ participate in event 822 (e.g., $P_A$, $P_B$, and $P_C$ event #5). The number of story lines and/or player characters that can be linked via a linking period may be unlimited or limited only by the available avatar positions or slots associated with a particular event.

In one embodiment, event 816 is triggered based on the time t2 such that, regardless of location of an avatar within a particular dungeon or virtual world 706, the story application 122 links the avatar-specific story lines 802 and 804 to enable player characters $P_A$ and $P_B$ to interact and/or concurrently perform activities associated with the same event 816.

In another embodiment, event 816 is triggered based on the completion of one or more prior events, such as event 814 ($P_A$ event #1) or event 826 ($P_B$ event #1), within a story line 802 or 804. Thus, the story application 122 may track the sequence of events associated with a story line, such as story line 802, and initiate the next event in the story line 802 based on the completion of one or more prior events in the story line sequence. The story line 802 sequence may be linear such that events occur in a particular order. For example, event #1 precedes event #2, which precedes event #3, and so on.

The story line 802 sequence may include a non-linear portion where events are not required to occur in a particular sequence, but can occur in a variety of orders or sequences. For example, the story application 122 may allow $P_A$ to perform event 818 (event #4 of $P_A$) prior to performing event 820 (event #3 of $P_A$). In this case, $P_A$ event #4 is not dependent on the occurrence or completion of $P_A$ event #3. Thus, the story application 122 may have the capability to allow different player characters to encounter the same story line and/or adventure in different sequences, even though the same overall objective and/or outcome of the story line is achieved by both player characters. In other embodiments, different player characters may have story lines with different overall objectives or goals that, nonetheless, intersect at different times and/or for different events. As discussed above, player character $P_A$ may be a policeman within a story line 802 with the objective to clean up crime within a virtual city. In contrast, player character $P_B$ may be a criminal within story line 504 with the objective to become the head of a crime syndicate with the virtual city.

In a further embodiment, a player character, such as $P_A$, may be given a notice and/or indicator during play of an opportunity to link with another player character, such as $P_B$. For example, after the completion of event 814 ($P_A$ event #1) at a time tn, player character $P_A$ may be given an opportunity to participate in the event 816 during a notice period 842 before the start of the event 816. If the player character $P_A$ accepts the opportunity, the story application 122 links the story line 802 with the story line 804 during the linking period 808 to enable event 816 to occur concurrently for both $P_A$ and $P_B$. If the player character $P_A$ does not accept the offer to link, the player character $P_A$ may proceed to another event. In one embodiment, the story application 122 allows player character $P_A$ to perform $P_A$ event #2 without linking with another story line and within the 802 story line using vactors. In certain embodiments, avatar $P_B$ may have purchased one half of a ticket, while avatar $P_C$ may have purchased the other half of the same ticket. Both avatars $P_B$ and $P_C$ may be given notice and an opportunity to meet and match the ticket halves at, for example, the linked event 828 during linking period 810.

In some embodiments, the story application 122 uses a combination of one or more of timing (time-based adventuring), event occurrence (event-based adventuring), and notice (opportunity-based adventuring) to provide players with a more realistic and enjoyable interactive multiplayer story experience. In addition to time, event, and notice based adventuring, the story application 122 may provide traditional location-based adventuring experiences. However, as a story and/or story line unfolds, a time-based adventure feature may allow players to dynamically encounter different settings and unpredictable scenarios, avoiding the need for avatars to travel to a predefined location to initiate or trigger a particular event or adventure.

While player characters may need to complete the same events or tasks to reach the end of a story line, the specific settings or surroundings of the each event may differ, given that each event may be triggered based on time, as opposed to location, resulting in the same event occurring in different locations for different player characters. For example, the player character $P_B$, acting as a criminal, may be given the opportunity to perform event 830, which requires $P_B$ to snatch a purse from a pedestrian in the street. The story application 122 may present event 830 at any time and/or location within a virtual world 706, to enable player character $P_B$ to complete the purse snatching event 830. The player character $P_A$ may perform the same purse snatching event 818 at a different time (e.g., $P_A$ event #4) and in a different location with different surroundings.

The story application 122 may use various time-based parameters such as time-based story line tracking that may enable the story application 122 to return a player character back to his previous point in a game and/or story line. While the story application 122 may track the progression of player characters through a story line, the story application 122 may prevent players from looking ahead in a story line, unless otherwise specified or requested by the players. By withholding information about future events within a story line or story lines, the story application 122 can enhance the unpredictability of a story line, making the gaming experience much more realistic and exciting.

In certain embodiments, multiple player characters may follow different avatar-specific story lines that only intersect or interact for a particular event, interact during various events, and/or continuously and repeatedly interact as part of a comprehensive story line involving a plurality of story lines. For example, as discussed previously, player characters $P_A$ and $P_B$ may be a policeman and criminal respectively, who follow their own independent story lines, but are linked for certain events. However, both independent story lines may be part of, or aspects of, a comprehensive story line about the growth and development of a virtual city.

By linking various story lines of various player characters at select times or for select events, the story application 122 can advantageous control the allocation of server processing resources. For example, the processing, control, and generation of event 816 may be performed using server 124A which may allow users, even user typically using different game servers, to interact with each other during a particular event 816. Existing MMORPGs must distribute subsets of players among different servers that redundantly provide the same dungeons so that a player character using one server cannot interact with a player character using a different server, even though both player characters may be performing in the same dungeon. Thus, the story application 122 may determine and/or predict which events that certain users are likely to encounter. Based on the determination and/or prediction, the story application 122 may assign certain players characters to a particular server 124A, while other player characters who more likely to encounter other events are assigned to another server 124B. In one embodiment, the story application 122 may dynamically assign and/or transfer an avatar (or multiple avatars) from one server to another server to perform a particular event.

Figure 9A:
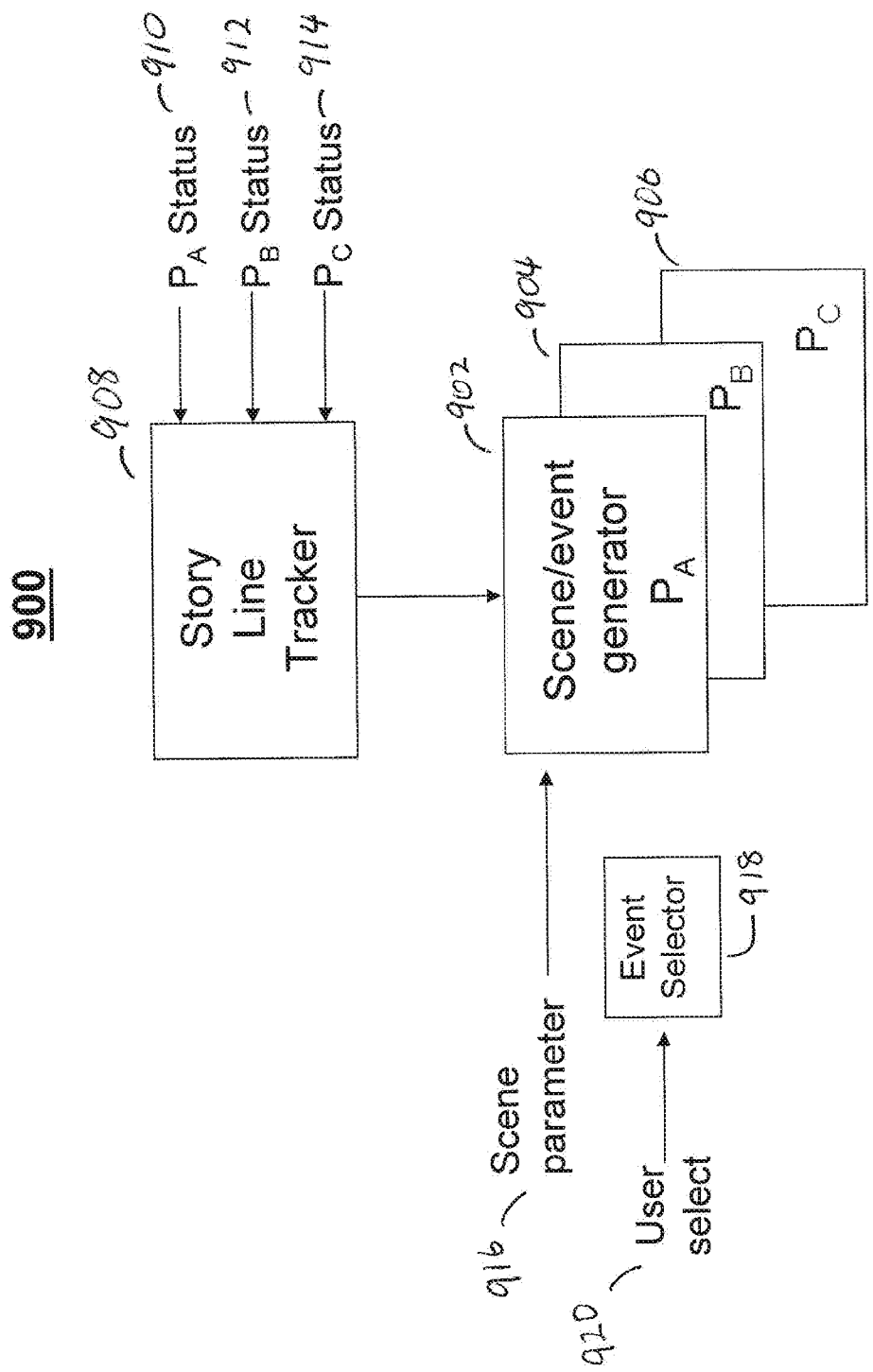
FIG. 9A is a functional block diagram of a system for managing story lines according to an illustrative embodiment of the invention.

FIG. 9A is a functional diagram of a system 900 for managing story lines according to an illustrative embodiment of the invention. The story application 122 may perform various methods using various functions to enable time, event, and/or opportunity based game play among multiple avatars. The system 900 may include a scene/event generator that supports multiple players $P_A$, $P_B$, and $P_C$ who experience multiple avatar-specific story lines concurrently and/or support multiple instantiations of a story. Thus, the story application 122 may use multiple scene event generator routines and/or functions 902, 904, and 906 to independently generate events and/or scene related to each of the multiple players $P_A$, $P_B$, and $P_C$ and/or events related to multiple stories and/or multiple instantiations of one or more stories. Similarly, the story application 122 (e.g., system 100) may use a story line tracker routine and/or function 908 that tracks the status 910, 912, and 914 of each of the multiple players $P_A$, $P_B$, and $P_C$ within their independent avatar-specific story lines concurrently or track status of one or more instantiations of one or more stories.

The story line tracker 908 may include a system of hardware and/or software that can store tracking data related to a player in a database. Tracking data may be recorded and stored in databases 122A and/or 122B. The tracking data, or recorded data, may include a player's elapsed time, completed activities, dungeons, events and/or availability. Subsequently, the stored data may be used by the scene/event generator $P_A$ 902 to determine the next scene or event for $P_A$. The story line tracker 908 may also take $P_A$ status 910, $P_B$ status 912 and $P_A$ status 914 as inputs to create a shared and/or linked event, such as event 822 (Event #5), to link the story lines of $P_A$, $P_B$, and $P_C$ together. The system 100 and/or story application 122 may provide one or more players with a user interface to configure tracking data used by the story line tracker 908.

The system 100 and/or story application 122, via the storyline tracker 908, may create, for each player, a tracked or recorded video corresponding to the player's playing history including actions performed by the player. The databases 128A and/or 128B may store each player's playing history and its associated data. Players may view, pause, sample a portion of, rewind, replay, create copies of, share with another player, sell, and/or modify one or more videos corresponding to their playing history. This way, players can review and analyze their playing history to create better adventuring tactics, for example, for their future adventuring activities. Videos of a player's playing history may be labeled or categorized according to various methods. In some embodiments, each player's playing history comprises a plurality of videos, where each video corresponds to the player's playing history in a particular chapter of a story, book, interactive movie, game, and/or any combination thereof. In certain embodiments, to allow for a more granular categorization of playing history, each video corresponds to the player's playing history in a particular scene within a chapter or event. In some instances, a player's playing history within one story, book, movie, or game is stored as a single video comprising a plurality of segments, where each segment may be similarly labeled or categorized according to the exemplary methods described above.

Furthermore, each video and/or each segment of a video may be indexed in the databases 128A and/128 B. This way, players can easily search and view other players' playing history, allowing the players to, e.g., share their adventuring tactics. The system 100 may also enable players to post online image frames corresponding to videos or segments of a video of their playing history, in addition to allowing players to post videos of their playing history.

The scene/event generator $P_A$ 902, the scene/event generator $P_B$ 904, and the scene/event generator $P_C$ 906 of their respective story applications may render relevant virtual world objects for a given event. The scene parameter input 916 may include other player and/or game specific data relevant to generating a new scene/event. Depending on whether story lines are being shared by one or more players, the story application 122 may generate the same or different scenes for each player character. In one embodiment, the story application 122 and/or system 900 may provide users with an interface so that a user select 920 input enables a player to select a scene and/or event, generated and listed by the scene/event generator $P_A$ 902, to be played next. In other embodiments, users can also configure the story application 122 and/or system 900 so that the event selector routine and/or function 918 can choose scenes or events for a player. A player may choose to configure the story application 122 and/or system 900 before, during, and/or after a playing a story application 122.

Once a player chooses a new scene or event, the scene/event generator $P_A$ 902 may choose a new scene or event based upon a predetermined set of rules, the selected story line, selected adventure, or a random selection process. A random scene/event generator used in the scene/event generator 902 may be based on a random number generator or any pseudorandom number generator such as the Monte Carlo methods. After a scene is chosen, the gaming application 122 may then generate the objects associated with that scene using the scene/event generator $P_A$ 902, $P_B$ and $P_C$.

Figure 9B:
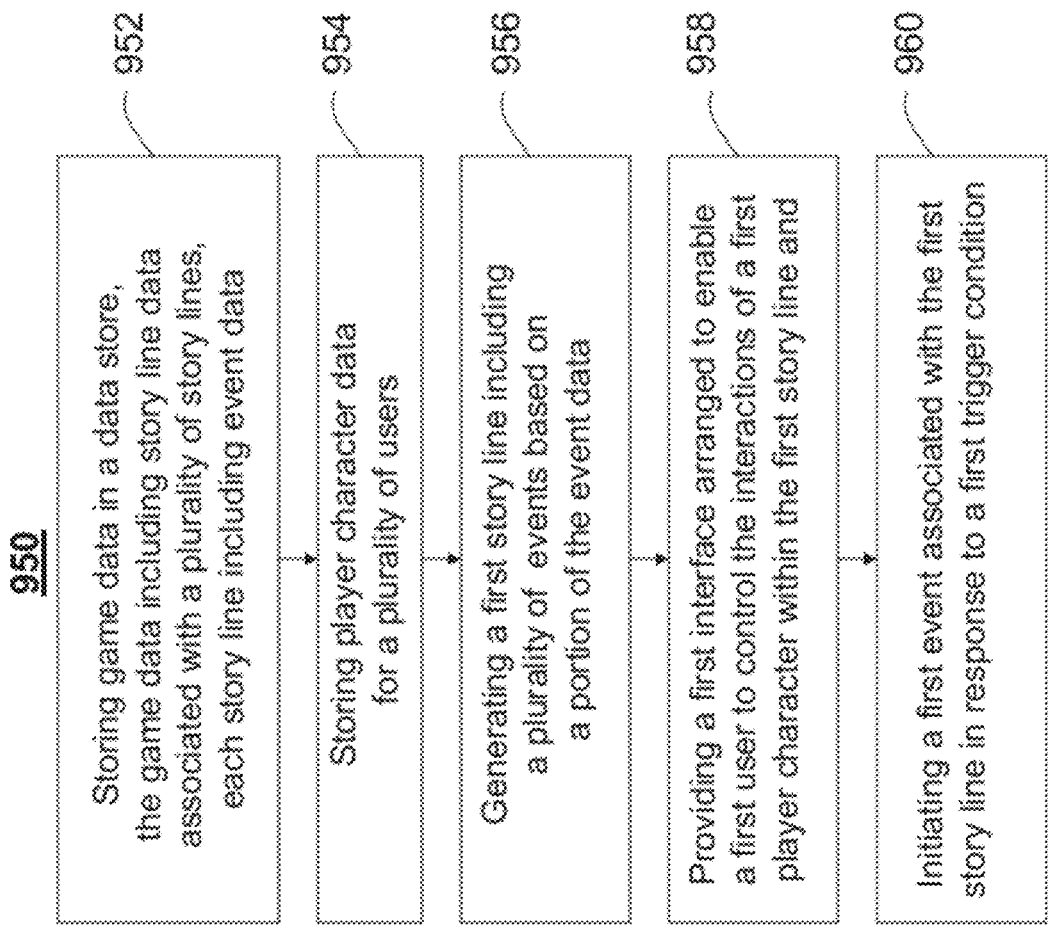
FIG. 9B is a flow diagram of a method for providing an interactive multiplayer story according to an illustrative embodiment of the invention.

FIG. 9B is a flow diagram of a method 950 for providing an interactive multiplayer story according to an illustrative embodiment of the invention. The method may be employed by the game servers 124A and/or 124B to advantageously provide players with interactive multiplayer stories. First, the interactive multiplayer story system 100 may store game data in a data store such as the databases 128A and/or 128B. Game data may include story line data associated with a plurality of story lines, where each story line may include event data (Step 952). Second, the method 950 may also allow the interactive multiplayer story system 100 to store player character data for a plurality of users (Step 954). The method may further enable the author clients 106A and/or 106B and user clients 110A, 110B and/or 110C to interact with the game data stored in databases 128A and/or 128B.

Next, the scene/event generator 902 of the story applications 122A and/or 122B may generate a first story line including a plurality of events based on a portion of the event data (Step 956) in response to a trigger condition. In one embodiment, the scene/event generator 902 can create a story line that is specific to a story and/or player by using the scene parameter input 916. In another embodiment, the scene/event generator 902 can create a linked story line, such as the event 816, based on the scene parameter input 916 to enable $P_A$ and $P_B$ to participate in the event 816 together. In some instances, the scene/event generator 902 generates one or more events related to one or more instantiations of a story so that various avatars are able to be joined to act out their various character roles associated the one or more events.

Then, the story applications 122A and/or 122B may provide a first interface arranged to enable a first user to control the interactions of a first player character within the first story line (Step 958). Examples of a graphical user interface may include the screenshot 700, 1000, and/or 1200. Other examples of an interface may include a mouse, a keyboard, a handheld controller, microphone, speaker, haptic interface, motion sensor, accelerometer, and/or other devices, without limitation, that enable a user to control the interactions of his player character. In one embodiment, an interface presented to one player can be the same as an interface presented to another player, such as, if $P_A$ and $P_B$ were to participate in the event 516 concurrently during a linking period. Players may also customize interfaces based on their personal preferences. In another embodiment, once $P_A$ and $P_B$ have completed the event 516, the story application 122 may reconfigure players' respective interfaces to the form presented prior to joining a linked event. Other details about a user interface and the control of a player character are contained in the descriptions with respect to FIGS. 700, 1000, and 1200.

Further, the scene/event generator 902 may initiate a first event associated with the first story line in response to a first trigger condition (Step 960). The trigger condition may be based on time, elapsed time, the completion of at least one prior event, the availability of at least one player character of the plurality of users to participate in the event. In certain embodiments, the triggers are stored as part of the scene parameter 916. A player may also choose which of the triggers should be used by the scene/event generator for creating a new scene.

Figure 10:
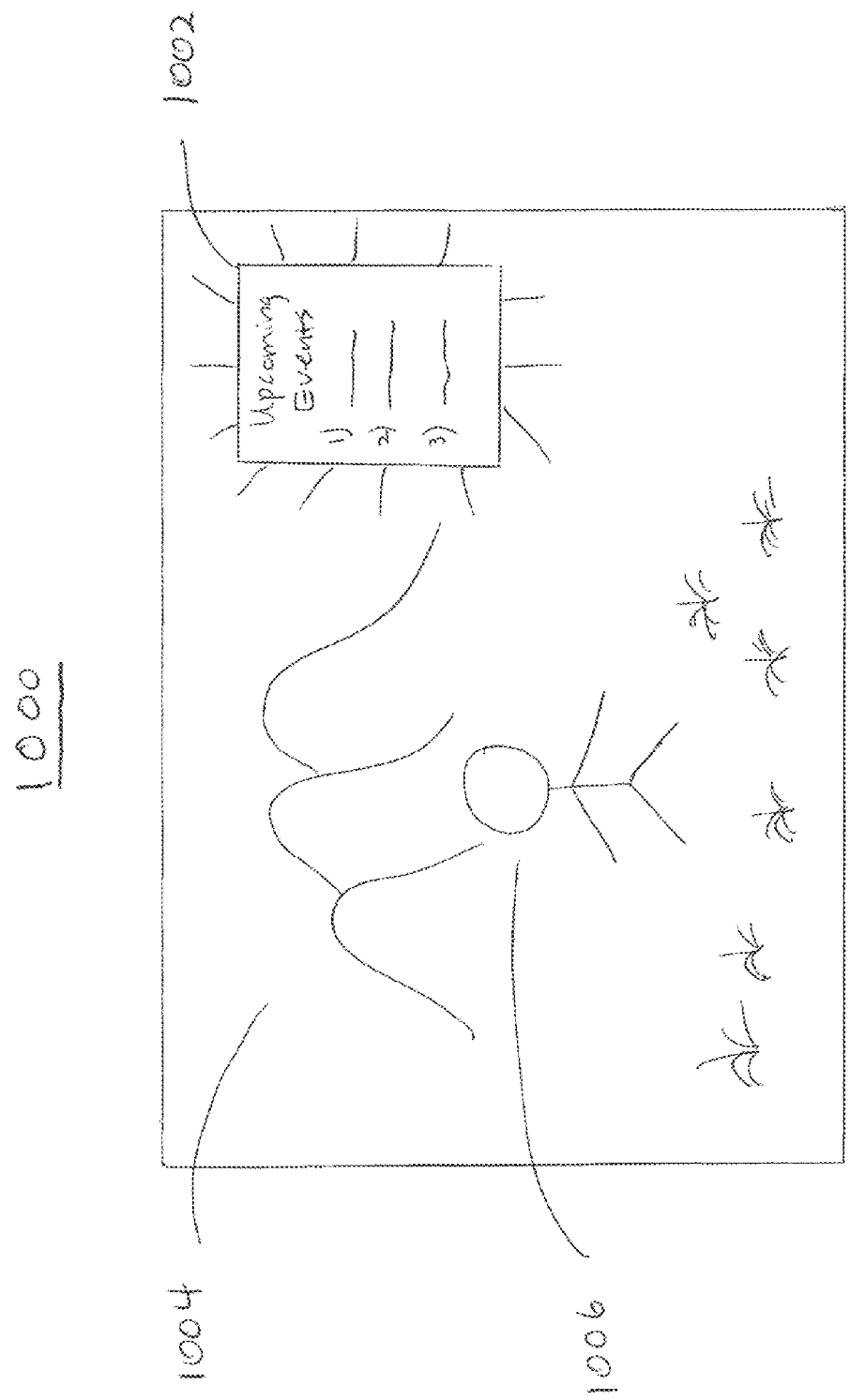
FIG. 10 is a screen shot of a virtual environment including an indication of upcoming events according to an illustrative embodiment of the invention.

FIG. 10 is a screen shot 1000 of a virtual environment including an indication of one or more upcoming events according to an illustrative embodiment of the invention. The screen shot 1000 includes a bulletin 1002, a background setting 1004 and an avatar 1006.

Depending on the configuration of a story application 122, a player's avatar 1006 may be presented with the bulletin 1002 that includes a user interface having, for example, a list of upcoming events, which may be generated by the scene/event generator 906. These events may include a scene, an adventure, a dungeon, short story, subplot, occurrence, an interaction with another player character or vactor, and/or any instance within a story line. In one embodiment, the bulletin 902 contains event 828 (Event #3) of FIG. 8 where the gaming application 122 has linked two story lines together for the player characters of players $P_B$ and $P_C$ to participate in the linked event 828. In a second embodiment, the bulletin 1002 contains a list of events such as event 814, event 820, and/or event 818 to enable player $P_A$ to make a selection to enable her player character to experience one of the events.

The bulletin 1002 may be accompanied by an indicator to attract a user's attention, especially when events contained in the bulletin 1002 may include a linking opportunity for two or more players. An indicator may be a glowing graphical object, a token, a ticket, a message, an alert, an icon, a change in display contrast, a change in display image, a glowing portion of a display, a sound, a counter, a glowing page in a graphical book, and a change in a portion of an interface that is displayed to a user.

The bulletin may be positioned anywhere on the screen shot 1000 and be oriented in any direction. The events listed on the bulletin 1002 may be also presented in a pop-up window or contained in a tool bar. Users may further configure the design and location of the bulletin 1002 based on their preferences.

In one embodiment, events may be listed statistically on the bulletin 1002. In another embodiment, the list of events on the bulletin 1002 can rotate so a user can view all the event descriptions in the case of having a list longer than the length of a bulletin 1002. The ordering of events on the bulletin 1002 may be based on, without limitations, alphabet, correlation score calculated by the quality control unit 1410, other player characters' rating, length of time, or any other game-specific and/or player specific ordering metrics. Users may also configure the ordering of events on the bulletin 1002 before, during or after a game and/or event.

Figure 11:
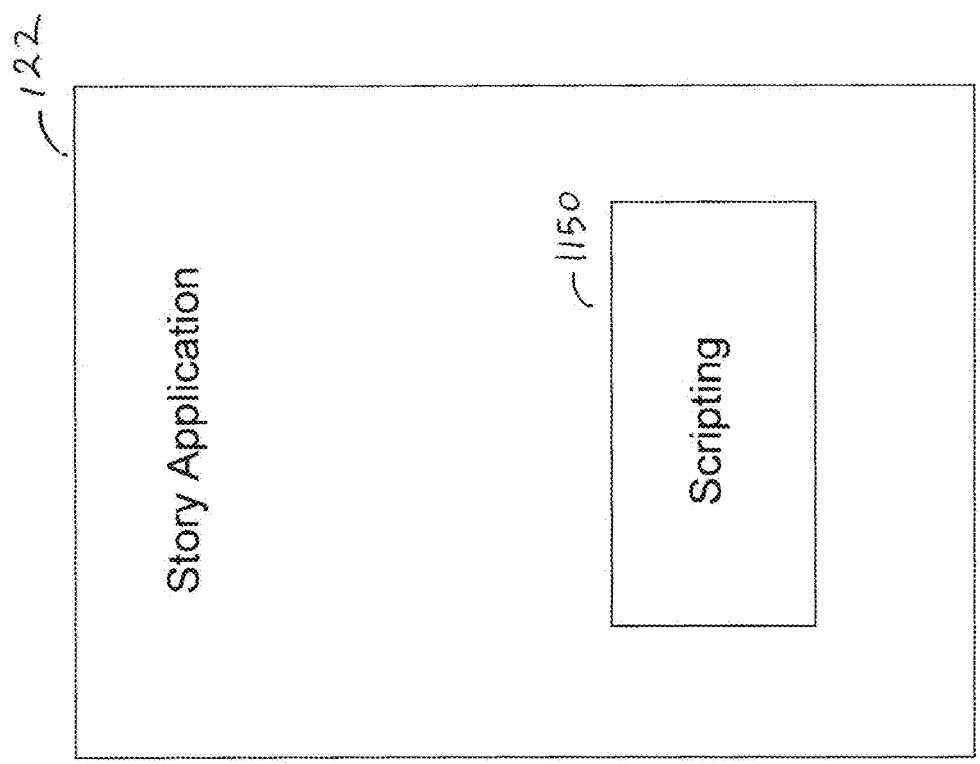
FIG. 11 is a block diagram of a gaming application according to an illustrative embodiment of the invention.

FIG. 11 is a block diagram of a gaming application 122 including a scripting routine and/or function 1150 according to an illustrative embodiment of the invention. The scripting function 1150 may be triggered automatically, may be user-enabled, or triggered automatically under certain user-selected conditions. While a player character is performing actions within a story line of a story application 122, the story application 122 may assume full or partial control of a player character to perform a scripted set of actions to assist the player in acting out a part of a story and/or story line and, thereby, assist the player in performing social interactions or other interactions in certain player character situations.

Figure 12:
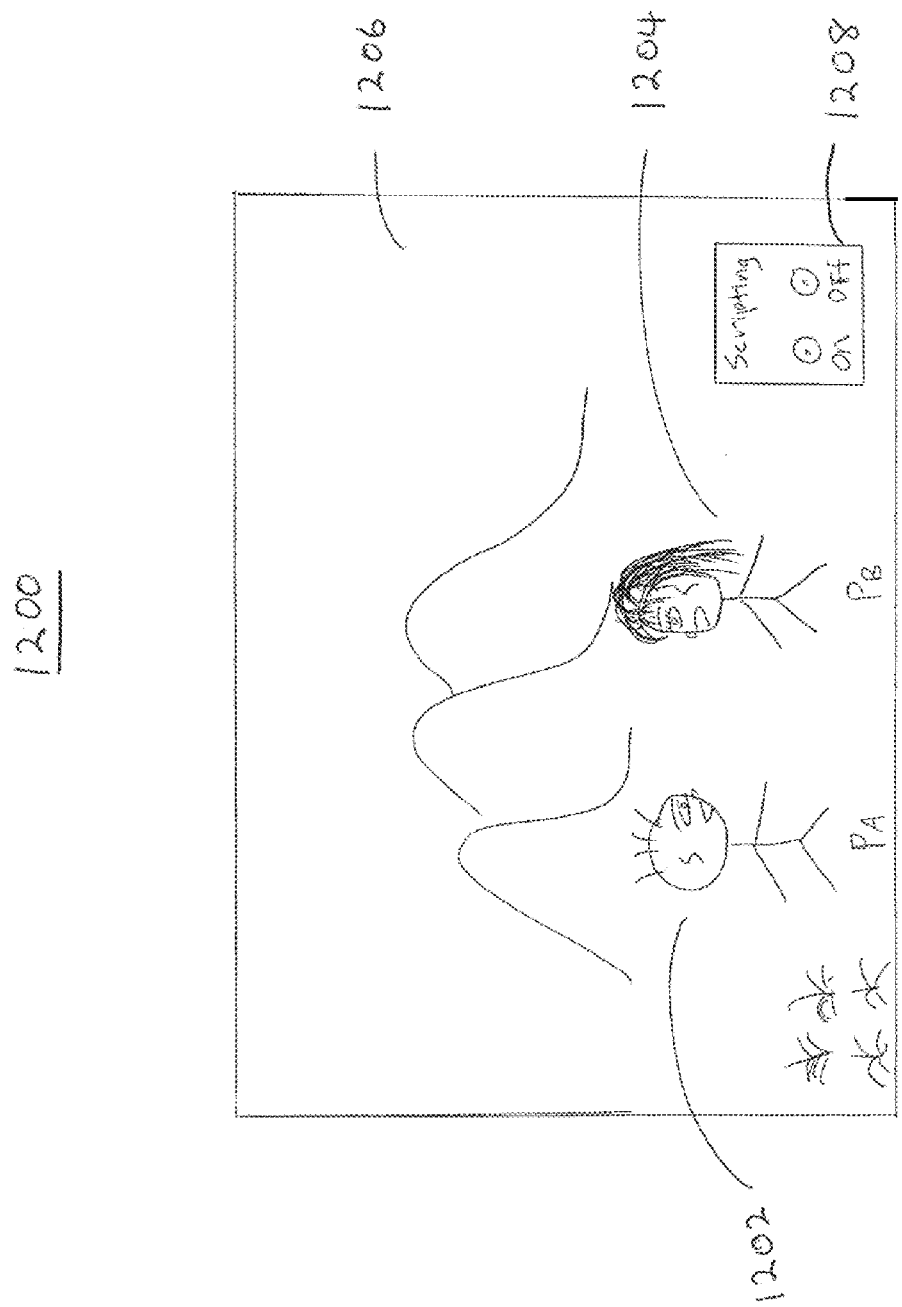
FIG. 12 is a screen shot of a virtual environment in which a player is prompted to use scripting according to an illustrative embodiment of the invention.

FIG. 12 is a screen shot 1200 of a virtual environment in which a player is prompted to use the scripting function 1150 according to an illustrative embodiment of the invention. The screen shot 1200 includes a scripting prompt 1202, a virtual scene 1206, a male avatar 1202, and a female avatar 1204. For example, a player may trigger the scripting function to ensure that their male avatar 1202 says the right things when interacting with a female avatar 1204 in a virtual bar. The female avatar's reaction may also be prescribed and/or controlled by the story application 122 if the scripting function 1150 is turned on by the female player 1204.

Players may customize the scripting function 1150. In one embodiment, the scripting function 1150 is configured to automatically provide responses under certain conditions. In a second embodiment, the scripting function 1150 is configured to be used minimally as a fail-safe at certain critical times, while allowing the player to handle most communications. A player may disable the scripting function or use the interface to enable the scripting function manually. The story application 122 may not reveal the use of the scripting function 1150 by one avatar to another avatar.

The design or format of the scripting prompt 1208 feature may come in various forms. In one embodiment, users can choose the type of the scripting prompt 1208 at the beginning of a game under the settings option. In a second embodiment, users can be prompted by a pop-up window to choose whether they wish to have the feature turned on or off. For example, the pop-up window may state "would you like to turn scripting on?" while providing "yes" and "no" button. In a third embodiment, the scripting prompt 1208 is displayed on the display screen along with the virtual scene 1206.

Figure 13:
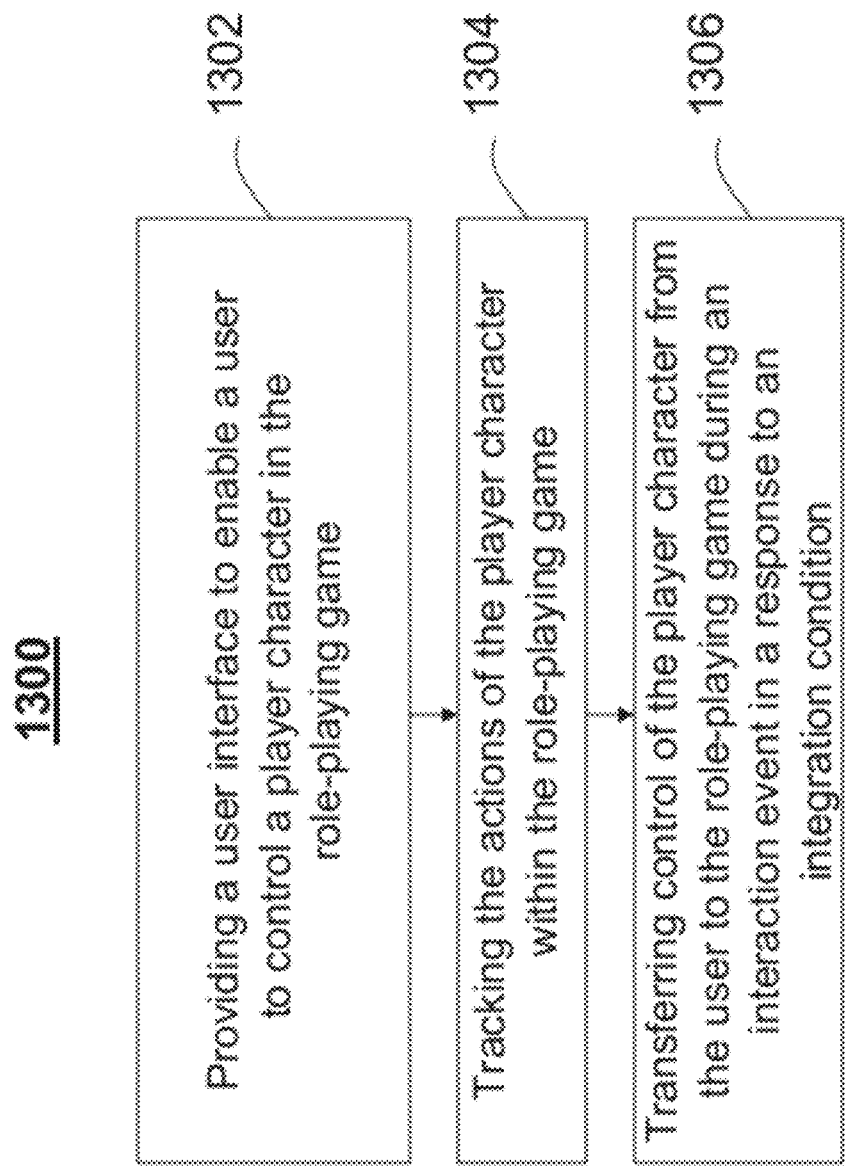
FIG. 13 is a flow diagram of a method for enabling player character interactions in an interactive multiplayer story according to an illustrative embodiment of the invention.

FIG. 13 is a flow diagram of a method 1300 for enabling player character interactions in an interactive multiplayer story according to an illustrative embodiment of the invention. First, the story application 122 may provide a user interface to enable a user to control a player character within the interactive multiplayer story (Step 1302). The user interface may include a GUI or other interface that enables a player to control the movement, configuration, actions, and/or interactions of one or more player characters.

The story application 122 may track the actions of the player character within the interactive multiplayer story using, for example, a story line tracker function 908 of FIG. 9A (Step 1304). By tracking a player character's progression within a story line, the story application 122 can monitor the interaction events of a player character to determine whether the story application should take control of the player character using the scripting function 1150.

Third, the scripting function may transfer control of the player character from the user to the interactive multiplayer story during an interaction event in response to an interaction condition (Step 1306). An interaction condition may include a type of interaction, location of interaction, time of interaction, characteristics of the entity being interacted with, and user acceptance of the interaction condition.

Once an interaction condition is satisfied and/or triggered, the story application 122 may take control of a player character using the scripting function 1150 so that the actions of the player character follow a script and/or sequence directed by scripting function 1150. In some embodiments, the interaction event includes at least one of a communication, a physical interaction, a mental interaction, a social interaction, a speaking, writing, acting out a part of a story line, performing an action, and performing a sequence of actions. An interaction condition may include a social interaction with a second player and/or player character. An example of such interaction is provided in the description for FIG. 12. Once the scripting function 1150 of the story application 122 finishes a scripted control sequence for a player character, the scripting function 1150 may automatically, and/or in response to a user prompt, transfer control of the player character back to the user.

In certain embodiments, the story application 122 may function as a training and/or educational application to enable employees and/or student to learn and/or acquire training and/or experience in performing certain tasks. For example, the story application 122 may provide a virtual representation of a building and/or facility. A security guard may use a player character to perform security functions throughout the virtual facility. The story application 122 may provide a variety of events and/or scenarios based on certain story-related trigger conditions. In this case, the story and associated story line may be related to providing security for the virtual facility. The user interface may provide any degree of interactivity with the user (e.g., security guard trainee) from providing a 2D interface to a detailed 3D interface (e.g., a virtual holodeck). The story application 122 may provide various story lines for employees, professionals, personnel, and/or students related to various occupational fields including, without limitation, health care, law enforcement, accounting, law, business, marketing, food services, transportation, entertainment, and/or the military.

Figure 14A:
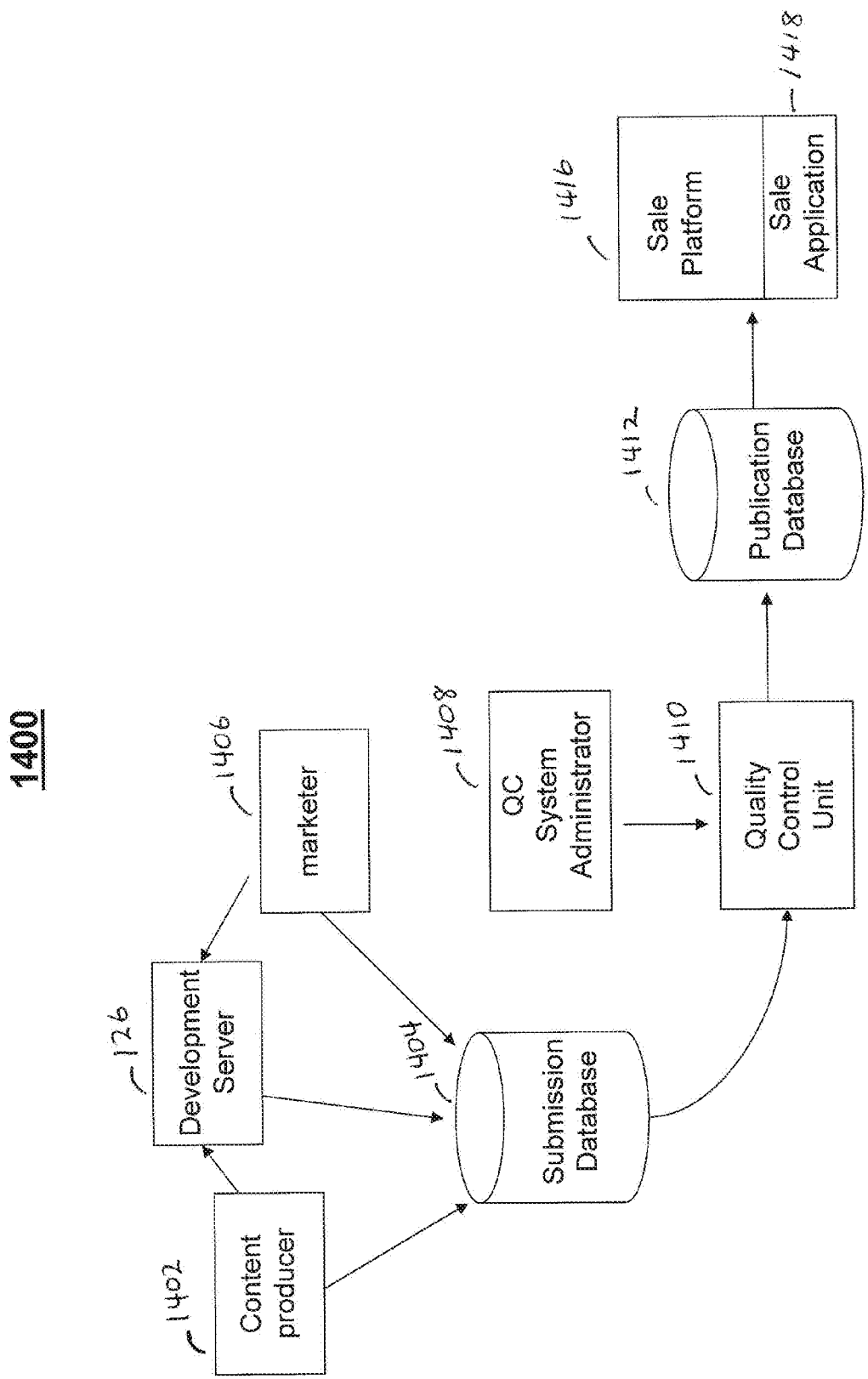
FIG. 14A is a diagram of a content creation platform according to an illustrative embodiment of the invention.

FIG. 14A is a diagram of a content creation platform 1400 according to an illustrative embodiment of the invention. The platform 1400 includes a content producer 1402, a submission database 1404, a marketer 1406, a quality control system administrator 1408, a quality control 1410, a publication database 1412, a sale platform 1414 and a sale application 1418.

The content producer 1402 may be a developer who produces content used in an interactive multiplayer story, such as story applications 122. The content producer 1402 may include one or more authors, novelists, writers of movie scripts, professional video game designers, level designers, music producers, or any other entities capable of producing contents used in an interactive multiplayer story. The content producer 1402 may produce content used in the entire story or only parts of a story. Similarly, the content producer 1402 may produce all levels in a game or some levels of a game. In some embodiments, the development server 126 as shown in FIG. 1 may integrate story lines created by various content producers 1412 into one story. The content producer 302 may also submit content from various sources, such as the author client 106A, to the submission database 1404 via the network 102.

The marketer 1406 may include a person, group, or business that provides items and/or merchandise to players within a virtual world, provided by, for example, the gaming application 122. The marketer 306 may include a company with a virtual establishment in the virtual world of the gaming application 122. The marketer 1406 may use an advertising agency and/or any other entity to sell and/or market merchandise in a particular interactive multiplayer story or virtual world of the gaming application 122. In one embodiment, development server 126 can be used to create all or portions of the merchandise for the marketers 1406. In another embodiment, the marketer 1406 may outsource the development of their merchandise to another entity. The scene/event generator 902, 904, 906, as described in FIG. 9A, may also tailor the merchandise of the marketer 1406 to a story and/or a player. All merchandise from the marketers 1406 may then be submitted into the "gaming submission" database 1404 through the network 102. In one embodiment, the content producer 1402 and marketer 1406 collaborate on the development of a story line using the development server 126 so that merchandise is integrated into a story line before submitting to the database 1404. The development server 126 may be operated by a content producer, a marketer, and/or the game producer. There may also be a plurality of development servers in various locations.

The submission database 1404 may include a memory and/or computing element that is capable of storing information electronically. The database 1404 may include one or more databases. The database 1404 may distribute an entire story or segments of a story across multiple databases. In addition to allowing the content producer 1402 and the marketer 1406 to store content into the submission database 1404, the content producer 1402 and or marketer 1406 may also retrieve and edit their stored data to enable a developer to make future updates. The quality control unit 1410 may also retrieve data from the submission database 1404. Certain communications with the submission database 1404 may be provided via the network 102.

The quality control unit 1410 may include a system or a plurality of systems of hardware and software, used to determine which submissions in the submission database 1404 should be published. The quality control unit 1410 may be automatically initiated, developer enabled, or automatically initiated under certain pre-defined conditions. The quality control unit 1410 may utilize a computing system, a program, and/or one or more persons to perform quality control functions. A person, acting as an analyst, may be someone with sufficient experience in gaming design such as, for example, a gaming developer. The quality control system administrator 1408 may monitor the on-going submission process and perform maintenance diagnostics on the systems used in the submission database 1404 and the quality control 1410.

To determine whether a submission should be published, the quality control unit 1410 may compare a submission against a set of acceptance rules. The acceptance rules may include quality of graphics, quality of image content, quality of theme, quality of actions, difficulty of story line, content rating, amount of offensive content, audio quality, correlation to other story lines, correlation to the interactive multiplayer story, size of the story line, the amount of merchandise included in the content, the amount of advertising in the content, the type of story, the genre of a story, the type of items in a story line, the effect of the story line on other story lines, the effect of story line on the interactive multiplayer story, popularity of the story line, number of votes the story line receives, and ranking of an author of the story line. Users, e.g. an analyst or administrator, may customize the acceptance rules by adding and/or removing additional rules based on preferences. The quality control unit 1410 may assign a numerical value, "correlation score," to a submission, based on the number of acceptance rules a submission satisfies. The quality control unit 1410 may further include a person that reviews a submission via a user interface. Submissions may also be indexed and ordered based on their "correlation score" so that the most relevant submissions may be presented earlier on an interface to a player. The quality control unit 1410 may also include a correlation algorithm that can decide how relevant a submission is to a story line. A correlation algorithm may include a Bayesian or other types of learning algorithm that can adapt automatically.

In one embodiment, after being reviewed by the quality control unit 1410, stories, level designs, merchandise, story applications or any other content submitted to the submission database 1404 may either be accepted and then stored in the publication database 1412, or returned to their respective writers or designers for revision, or refused for publication. Subsequently, the quality control unit 1410 may review a returned and/or revised submission. In some cases, a submission may never enter the publication database 1412.

Certain accepted submissions from the submission database 1404 may then be stored in the publication database 1412. The publication database 1412 may include a plurality of databases such as the database 128A and 128B. In some embodiments, the user 110A can enable a user to purchase various contents stored in the publication database 1412 through the sale platform 1416.

The sale platform 1416 may be a system of hardware and software that displays products stored in the publication database 1412 by providing users with a graphical or textual interface. The sale platform 1416 may include game server 124 such that selling and/or marketing of game data to users is performed during, before, or after a user's gaming experience. Once a user has purchased and/or selected the desired content, the sale platform 1416 may process the request by retrieving the necessary executable computer codes for installing and running the story application 122 on the game server 124A. Users may also install and run part of the story application 122 on a local machine, offloading work from the game server 124A and/or the network 102. Alternatively, the story application 122 may already have the software or code for the purchased gaming data (e.g., story, or item). Thus, the story application can be configured to enable the user to use the purchased gaming data.

While a user is participating in an interactive multiplayer story, the sale platform 1416 may trigger a scenario or present a scene, adventure, and/or story line for purchase. These scenarios or scene, adventure, and/or story line may at least be triggered by time, player character availability and any other event generating parameters in the scene parameter 916. For example, when a male avatar and a female avatar are socializing in a virtual dance club, sale platform and/or application 1416 may trigger the display of various related items so that a male avatar may purchase an item, such as a martini, to show affection towards a female avatar, and, therefore, enhance the social interactions experienced by the players.

The sale platform 1416 may include a sale application 1418 that provides a mechanism for monetizing products purchased by a user. The sale application 1418 may provide secured communications via a network for monetary transactions and exchanges. It may further provide content producers with the ability to trademark, copyright, or patent their products within a virtual world, and, thereby, protect the rights associated with these contents.

Figure 14B:
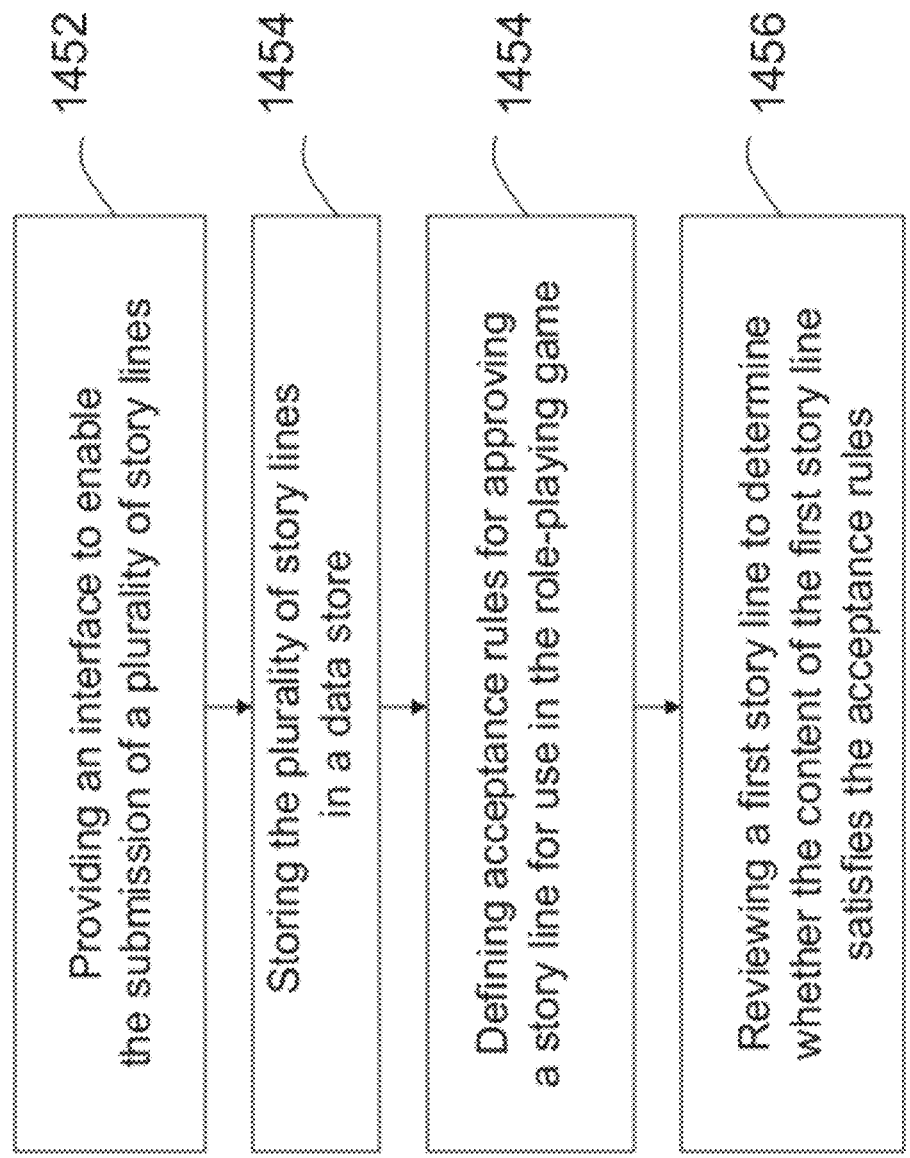
FIG. 14B is a flow diagram of a method for developing story lines for an interactive multiplayer story according to an illustrative embodiment of the invention.

FIG. 14B is a flow diagram of a method 1450 for developing story lines for an interactive multiplayer story according to an illustrative embodiment of the invention. The interactive multiplayer story system 100 may employ the method 1450 to provide rich interactive multiplayer story related gaming content to a player. First, the story applications 122 or the development server 126 may interact with a content producer 1402 and/or marketer 1406 by providing an interface to enable the submission of a plurality of story lines (Step 1452). An interface may be any graphical, textual, audible or haptic representation that allows a user to interact with a system.

The content creation platform 1400 may allow the author clients 106A and 106B to store the plurality of story lines in a data store 1404 (Step 1454). The data store may include the submission database 1404 to which the content producer 1402, the development server 126, and the marketer 1406 may submit their respective content. In one embodiment, the story lines in a data store include an event, a plurality of events and a plurality of story lines. The story lines may include a saga, a dungeon, a quest, a short story, an episode, a scene, an occurrence and/or an interaction among characters. The story lines may include media content associated with a movie, television show, book, story, play, video game, video, and/or song.

The content creation platform 1400 may define acceptance rules for approving a story line for use in the interactive multiplayer story (Step 1456). The acceptance rules may include quality of graphics, quality of image content, quality of theme, quality of actions, difficulty of story line, content rating, amount of offensive content, audio quality, correlation to other story lines, correlation to the interactive multiplayer story, size of the story line, the amount of merchandise included in the content, the amount of advertising in the content, the type of story, the genre of a story, the type of items in the story line, the effect of the story line on other story lines, the effect of the story line on the interactive multiplayer story, approval from a reviewer, popularity of the story line, number of votes the story line receives, and/or ranking of an author of the story line. The quality control unit 1410 and the quality control system administrator 1408 may follow the acceptance rules when reviewing content stored in the submission database 1404.

Then, the content creation platform 1400 may review a first story line to determine whether the content of the first story line satisfies the acceptance rules (Step 1458). In some embodiments, a story line or merchandise is reviewed by a person based on the acceptance rules, and the content creation platform 1400 can provide the person with a reviewer interface to enable him to review the content. The reviewer may provide an acceptance or denial of the content and the accepted content may be sent to the publication database 1412. For content that satisfies the acceptance rules, the sale platform 1416 and the sale application 1418 may prompt the user to purchase the story line via the user interface, whereas the prompt may occur while the user is playing an interactive multiplayer story application 122, or before or after the user plays the role-playing story application 122. Finally, the sale application 1418 may integrate at least one item of merchandise into a story line and set intellectual property rules associated with the item in the interactive multiplayer story.

It will be apparent to those of ordinary skill in the art that methods involved in the present invention may be embodied in a computer program product that includes a computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof as understood by those skilled in the art with respect to the following claims.

What is claimed is:

1. A method for controlling player character interactions in an interactive multiplayer computer-implemented game comprising:

providing, by a server processor to one or more client processors, a data interface for the interactive multiplayer computer-implemented game to enable a first user and a second user at the one or more client processors to control a first user-controlled player character and a second user-controlled player character, respectively, in the interactive multiplayer computer-implemented game, tracking, by the server processor, the actions of the first and second user-controlled player characters within the interactive multiplayer computer-implemented game, transferring, by the server processor, control of the first user-controlled player character away from the first user and to the server processor providing the interactive multiplayer computer-implemented game, wherein the transferring of control occurs during an interaction event between the first user-controlled player character and the second user-controlled player character in response to an interaction condition, wherein the interaction condition is automatically initiated by the interactive multiplayer game based on interaction rules, and wherein the interaction rules include at least one of type of interaction, location of interaction, time of interaction, a characteristics of the entity being interacted with, user acceptance of the interaction condition, proximity between the first and second player characters, and proximity of the first player character in relation to the location of an interaction associated with an event or activity.

2. The method of claim 1, wherein the interaction event includes a social interaction.

3. The method of claim 1, wherein the server processor controls the actions of the second player character during the interaction event.

4. The method of claim 1 comprising prompting the first user to initiate the interaction condition.

5. The method of claim 4, wherein prompting includes presenting a request for input via a user interface associated with the first user to initiate the interaction condition.

6. The method of claim 1, wherein the interaction event includes at least one of a communication, a physical interaction, a mental interaction, a social interaction, speaking, writing, acting out a part of a story, performing an action, performing an activity other than acting out a part of a story, and performing a sequence of actions.

7. The method of claim 1 comprising transferring control of the first player character to the first user upon completion of the interaction event.

8. A method for controlling player character interactions in an interactive multiplayer computer-implemented game comprising:
providing, by a server processor to one or more client processors, a data interface for the interactive multiplayer computer-implemented game to enable a first user and a second user at the one or more client processors to control a first user-controlled player character and a second user-controlled player character, respectively, in the interactive multiplayer computer-implemented game,
tracking, by the server processor, the actions of the first and second user-controlled player characters within the interactive multiplayer computer-implemented game, and
transferring, by the server processor, control of the first user-controlled player character away from the first user and to the server processor providing the interactive multiplayer computer-implemented game, wherein the transferring of control occurs during an interaction event between the first user-controlled player character and the second user-controlled player character in response to an interaction condition,
wherein the interaction condition is automatically initiated by the interactive multiplayer game based on interaction rules, and
wherein the interaction rules are configured by the first user.

9. A system for enabling player character interactions in an interactive multiplayer game or story comprising:
a data interface arranged to exchange communications for enabling a first user to control a first player character in the interactive multiplayer game or story,
a processor, in communication with the data interface, for i) tracking the actions of the first player character within the interactive multiplayer game or story, and ii) transferring control of the first player character from the first user to the processor during an interaction event with a second player character in response to an interaction condition, the second player character being controlled by a second player via the data interface,
wherein the interaction condition is automatically initiated by the processor based on interaction rules, and
wherein the interaction rules include at least one of type of interaction, location of interaction, time of interaction, a characteristics of the entity being interacted with, user acceptance of the interaction condition, proximity between the first and second player characters, and proximity of the first player character in relation to the location of interaction associated with an event or activity.

10. The system of claim 9, wherein the interaction event includes a social interaction.

11. The system of claim 9, wherein the processor controls the actions of the second player character during the interaction event.

12. The system of claim 9, wherein the processor prompts the first user to initiate the interaction condition.

13. The system of claim 12, wherein prompting includes presenting a request for user input via a user interface associated with the first user to initiate the interaction condition.

14. The system of claim 9, wherein the interaction event includes at least one of a communication, a physical interaction, a mental interaction, a social interaction, speaking, writing, acting out a part of a story line, performing an action, performing an activity other than acting out a part of a story, and performing a sequence of actions.

15. The system of claim 9, wherein the processor transfers control of the first player character to the first user upon completion of the interaction event.

16. A system for enabling player character interactions in an interactive multiplayer game or story comprising:
a data interface arranged to exchange communications for enabling a first user to control a first player character in the interactive multiplayer game or story, and
a processor, in communication with the data interface, for i) tracking the actions of the first player character within the interactive multiplayer game or story, and ii) transferring control of the first player character from the first user to the processor during an interaction event with a second player character in response to an interaction condition, the second player character being controlled by a second player via the data interface,
wherein the interaction condition is automatically initiated by the processor based on interaction rules, and
wherein the interaction rules are configured by the first user.

17. A game server for enabling player character interactions in an interactive multiplayer game or story comprising:
a tracking unit for tracking the actions of a first player character within the interactive multiplayer game or story,
a data interface arranged to exchange communications to enable a first user to control the first player character in the interactive multiplayer game or story, and
a control unit for transferring control of the first player character from the first user to the control unit during an interaction event with a second player character controlled by a second player in response to an interaction condition,
wherein the interaction condition is automatically initiated by the control unit based on interaction rules, and
wherein the interaction rules include at least one of type of interaction, location of interaction, time of interaction, a characteristics of the entity being interacted with, user acceptance of the interaction condition, proximity between the first and second player characters, and proximity of the first player character in relation to the location of interaction associated with an event or activity.

* * * * *